US008824361B2

(12) United States Patent
Rügamer et al.

(10) Patent No.: US 8,824,361 B2
(45) Date of Patent: Sep. 2, 2014

(54) MULTI-FREQUENCY BAND RECEIVER BASED ON PATH SUPERPOSITION WITH REGULATION POSSIBILITIES

(75) Inventors: Alexander Rügamer, Nuremberg (DE); Santiago Urquijo, Erlangen (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 112 days.

(21) Appl. No.: 13/555,978

(22) Filed: Jul. 23, 2012

(65) Prior Publication Data
US 2013/0021934 A1 Jan. 24, 2013

Related U.S. Application Data

(63) Continuation of application No. PCT/EP2010/065813, filed on Oct. 20, 2010.

(30) Foreign Application Priority Data

Jan. 22, 2010 (DE) .......................... 10 2010 001 147

(51) Int. Cl.
*H04B 1/06* (2006.01)

(52) U.S. Cl.
USPC ...................... 370/317; 455/240.1; 455/188.1

(58) Field of Classification Search
USPC ............... 370/252, 316, 317; 455/552.1, 296, 455/230, 232.1, 233.1, 234.1, 239.1, 240.1, 455/245.1, 150.1, 188.1, 189.1, 190.1, 455/191.1; 375/316
See application file for complete search history.

(56) References Cited

U.S. PATENT DOCUMENTS

| 6,549,884 B1 | 4/2003 | Laroche et al. |
| 6,766,300 B1 | 7/2004 | Laroche |
| 8,145,263 B2 * | 3/2012 | van Rooyen ............... 455/552.1 |

(Continued)

FOREIGN PATENT DOCUMENTS

| JP | 11-194796 | 7/1999 |
| JP | 2001-075571 | 3/2001 |
| JP | 2004-527000 | 9/2004 |
| WO | 02084645 A2 | 10/2002 |

OTHER PUBLICATIONS

Dolson, Mark, "The Phase Vocoder: A Tutorial", Computer Music Journal, vol. 10, No. 4, 1986, 14-27.

(Continued)

*Primary Examiner* — Kerri Rose
(74) *Attorney, Agent, or Firm* — Michael A. Glenn; Perkins Coie LLP

(57) ABSTRACT

A multi-frequency band receiver includes first and second receive paths, a combiner, a code multiplex baseband stage and an amplifier controller. The first and second receive paths receive and process first and second code multiplex signals, respectively. The first or the second receive path includes an amplifier having a variable gain factor. The combiner superposes the first and second processed code multiplex signals. The code multiplex baseband stage processes the superposed code multiplex signal to obtain and use first and second baseband receive signals. The first and second baseband receive signals represent data of the first and second code multiplex signals, respectively. In addition, the amplifier controller controls the gain factor of the amplifier having a variable gain factor so that the first or the second baseband receive signal includes a minimum reception quality which can be variably predetermined and is dependent on the operating state.

21 Claims, 18 Drawing Sheets

(56) References Cited

U.S. PATENT DOCUMENTS

| | | | | |
|---|---|---|---|---|
| 2002/0068540 | A1* | 6/2002 | Skarman et al. | 455/232.1 |
| 2002/0111149 | A1* | 8/2002 | Shoki | 455/277.1 |
| 2002/0196876 | A1* | 12/2002 | Takada | 375/346 |
| 2007/0096980 | A1 | 5/2007 | Gradincic et al. | |
| 2009/0080571 | A1* | 3/2009 | Shimizu et al. | 375/319 |
| 2009/0201950 | A1* | 8/2009 | Kakura et al. | 370/477 |
| 2010/0233986 | A1* | 9/2010 | Yamaji et al. | 455/314 |
| 2011/0112670 | A1 | 5/2011 | Disch et al. | |

OTHER PUBLICATIONS

Dutilleux, et al., "DAFX: Digital Audio Effects", Wiley & sons, Edition 1; Inventors: Dutilleux, Poli, Zolzer, Feb. 26, 2002, 201-298.

Duxbury, C. et al., "Separation of Transient Information in Musical Audio Using Multiresolution Analysis Techniques", Proc. of the COST G-6 Conf. on Digital Audio Effects (DAFX-01), Limerick, Ireland, Dec. 2001, Total of 4 pages.

Flanagan, J.L. et al., "The Bell System Technical Journal", Nov. 1966, 1493-1508.

Laroche, Jean et al., "Improved Phase Vocoder Time-Scale Modification of Audio", IEEE Transaction on Audio and Speech Processing, vol. 7, No. 3, May 1999, 1-10.

Laroche, Jean et al., "New Phase-Vocoder Techniques for Pitch Shifting, Harmonizing and Other Exotic Effects", Proc. IEEE Workshop on Applications of Signal Processing to Audio and Acoustics, New Paltz, NY, Oct. 1999, 91-94.

Misra, et al., "A New Paradigm for Sound Design", Proc. of the 9th Int'l Conference on Digital Audio Effects (DAFx-06), Montreal, Canada, Sep. 18-20, 2006, pp. 319-324.

Noguchi, Kenichi et al., "Non Stationary Noise Detection and Reduction of a Single Channel Input", NTT Cyber Space Labs. NTT Corporation, Tokyo, Japan, Mar. 2004.

Nsabimana, et al., "Transient Encoding of Audio Signals Usign Dyadic Approxmations", Proc. of the 10th Int'l Conference on Digital Audio Effects (DAFx-07), Bordeaux, France, Sep. 10-15, 2007, pp. 1-8.

Nsabimana, Francois X. et al., "Audio Signal Decomposition for Pitch and Time Scaling", IEEE Int'l Symposium on Communications, Control and Signal Processing, Piscataway, NJ; XP031269268, Mar. 2008, 1285-1290.

Puckette, Miller, "Phase-locked Vocoder", IEEE ASSP Conf. on Application of Signal Processing to Audio and Acoustics, Oct. 1995, Total of 4 pages.

Ravelli, Emmanuel et al., "Fast Implementaion for Non-Linear Time-Scaling of Stereo Signals", Proc. of the 8th Int. Conf. on Digital Audio Effects, Madrid, Spain, Sep. 2005, Total of 4 pages.

Roebel, Axel, "A New Approach to Transient Processing in the Phase Vocoder", Proc. of the 6th Int. Conf. on Digital Audio Effects, London, UK, Sep. 2003, Total of 6 pages.

Verma, et al., "Extending Spectral Modeling Synthesis with Transient Modeling Sythesis", Computer Music Journal; 24:2; Massachusetts Institute of Technology, Summer 2000, pp. 47-59.

"4 RF Basics", Ellinger. Chapter 4.3.3., copyright 2007, pp. 90-91.

"Galileo Open Service: Signal in Space Interface Control Document", OS SIS ICD, Draft 1. European Space Agency/European GNSS Supervisory Authority, Feb. 2008, 179 pages.

"NavX-NCS Flyer", Sep. 2009, 2 pages.

Alonso, A et al., "A Direct Sampling Digital Receiver for Mulitple GNSS Signals", ENC-GNSS, Apr. 2008, 5 pages.

Detratti, M et al., "Dual-Band RF Front-End Solution for Hybrid Galileo/GPS Mass Market Receivers", IEEE CCNC 2008 Proceedings, Jan. 2008, pp. 603-607.

Forster, F et al., "High Performance Receiver Front-End for Multiple Galileo Frequencies", Proceedings of the 18th International Technical Meeting of the Satellite Division of The Institute of Navigation (ION GNSS 2005); Long Beach, California, Sep. 2005, 6 pages.

Gao, G et al., "DME/TACAN Interface and its Mitigation in L5/E5 Bands", Proceedings of the 20th International Technical Meeting of the Satellite Division of the Institute of Navigation (ION GNSS 2007), Sep. 2007, 10 pages.

Gisbert, J et al., "Interference Assessment Using Up to Date Public Information of Operating and Under Development RNSS Systems", ESA-ESTEC, 2009, 9 pages.

Kaplan, et al., "Understanding GPS: Principles and Applications", Chapter 6.2.2.5, Effects of Interference on Acquisition, Carrier Tracking, and Data Demodulation, copyright 2005, pp. 256-269.

Ko, J et al., "A 19-mW 2.6-mm L1/L2 Dual-Band CMOS GPS Receiver", IEEE Journal of Solid-State Circuits. vol. 40, No. 7., Jul. 2005, pp. 1414-1425.

Parada, E et al., "Design of a GPS and Galileo Multi-Frequency Front-End", IEEE. Institute of Microtechnology, EPFL, Switzerland., Apr. 2009, 5 pages.

Rebeyrol, E et al., "BOC Power Spectrum Densities", ION NTM 2005, San Diego, California, Jan. 2005, 10 pages.

Sleewaegen, J et al., "Galileo AltBOC Receiver", Septentrio NV, Belguim. ESA-ESTEC, The Netherlands May 2004 9 pages.

\* cited by examiner

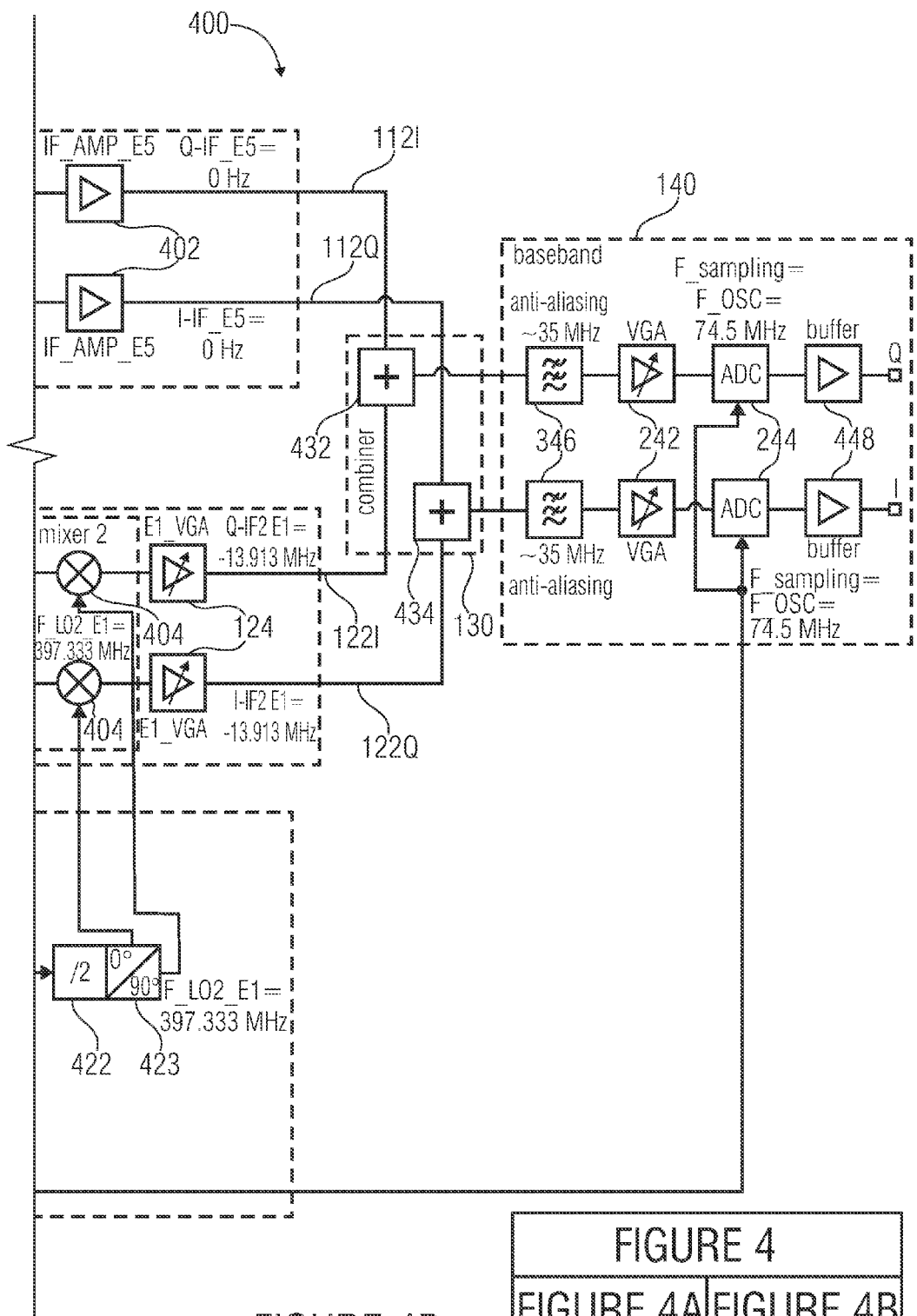

US 8,824,361 B2

MULTI-FREQUENCY BAND RECEIVER BASED ON PATH SUPERPOSITION WITH REGULATION POSSIBILITIES

CROSS-REFERENCE TO RELATED APPLICATIONS

This application is a continuation of copending International Application No. PCT/EP2010/065813, filed Oct. 20, 2010, which is incorporated herein by reference in its entirety, and additionally claims priority from German Application No. 10 2010 001 147.9, filed Jan. 22, 2010, which is also incorporated herein by reference in its entirety.

Embodiments in accordance with the invention relate to wireless data communication, and in particular to a multi-frequency band receiver and to a method of receiving code multiplex signals with a multi-frequency band receiver.

BACKGROUND OF THE INVENTION

In some years' time, at least four independent, but interoperable global satellite navigation systems (GNSS—global navigation satellite systems) will be available: Galileo, GPS III, GLONASS and COMPASS. Said new and modernized systems will provide new signals and services. It will be the first time that open-service signals (free-service signals) will be globally available on more than one frequency band. The performance of receivers will be improved by using multi-band navigation.

For example, increased accuracy may be achieved. Multi-band reception enables measuring and removing the ionospheric error. The new wide-band signals, above all Galileo E5 having a bandwidth of more than 72 MHz, promise to provide exceptional multi-path stability and increased tracking accuracy.

Likewise, availability may be increased. Interoperability between all GNSS systems increases the availability of space vehicles from currently 24 GPS Naystar and a few GLONASS to more than 100 space vehicles with additional Galileo and COMPASS satellites. Both the service availability, e.g. in street canyons, and the dilution of precision (DOP) and, thus, positional accuracy may be improved.

In addition, robustness may be increased. If a signal band exhibits a malfunction, it will still be possible to use a different one.

Moreover, integrity may be improved. Galileo will provide integrity data within the context of its service for the protection of human life in the I/NAV type of messages, which is broadcast via E5b-1 and E1-B (see "Galileo Open Service Signal in Space Interface Control Document (OS SIS ICD), Draft 1, "techn. rep., European Space Agency/European GNSS Supervisory Authority, February 2008"). This service is crucial for many applications relevant to security.

Once said new GNSS signals are available, several new or improved applications will become possible due to the advantages mentioned above, particularly in the mass market sector. However, mass market applications may use small, low-power and low-cost receiver devices. This is why an integrated approach is desired.

Front-end receivers (input component of a receiver) for said new and almost any wide-band signals are already available, but mostly consist of large, expensive discrete approaches for professional high-end applications which have high power consumption. First integrated multi-band front-end solutions are available now but leave room for improvement.

Four different approaches for multi-band receivers are common today.

For special applications such as GNSS reference receivers, there are the discrete high-end front-ends (or input components of the upper performance category, see, e.g., "F. Foerster, A. Carrera, N. Lucas and G. Rohmer, "High Performance Receiver Front-End for Multiple Galileo Frequencies", in Proceedings of the 18th International Technical Meeting of the Satellite Division of the Institute of Navigation ION GNSS 2005, pp. 935-940, September 2005"). Said front-ends provide maximum accuracy, but are not suited for the application intended due to their high price, their very high power consumption and their size.

Through the progress made in the field of high-performance analog-to-digital converters (ADC), RF (radio frequency) or sub-sampling ADC front-ends are becoming increasingly attractive also for wide-band signals (see "A. Alonso, J.-M. Perre, and I. Arizaga, "A Direct Sampling Digital Receiver For Multiple GNSS Signals", in Proc. of ENC-GNSS 2008, 2008", "E: R. Parada, F. Chastellain, C. Botteron, Y. Tawk, and P.-A. Farine, "Design of a GPS and Galileo Multi-Frequency Front-End", in IEEE 69th Vehicular Technology Conference: VTC2009-Spring 26-29 Apr. 2009, Barcelona, Spain, 20092"). The desired signals are filtered and subsequently down-converted while using intentional aliasing in analog-to-digital conversion. This type of architecture may use an extremely low-jitter clock as well as an ADC having a high analog input frequency bandwidth. The sub-sampling architecture exhibits high power consumption in the front-end and also in subsequent digital baseband signal processing. Generally, this architecture suffers from interferences, aliasing of out-of-band noise in the IF (intermediate frequency) range, and potential instability due to the high gain needed within one frequency range. Therefore, the sub-sampling architecture is not suited for an integrated receiver of the advanced mass market.

Another way multi-band reception can be provided is by using separate single-frequency front-ends for each desired GNSS signal or by integrating several more or less stand-alone receivers on one single chip (see "Z. Gradincic, "Multi-band GNSS Receiver," 2007. US 20070096980 A1"). This is the straightforward way, but it suffers from home-made interferences through the different frequency synthesizers needed and is not an economic or optimized solution in terms of power consumption and size.

Other fully integrated multi-band front-end architecture solutions proposed in "M. Detratti, E. Lopez, E. Perez, and R. Palacio, "Dual-Band RF Front-End Solution for Hybrid Galileo/GPS Mass Market Receivers," in Consumer Communications and Networking Conference, 2008. CCNC 2008, 5th IEEE, pp. 603-607, January 2008" and "J. Ko, J. Kim, S. Cho, and K. Lee, "A 19-mW 2.6 mm2L1/I2 dual-band CMOS GPS receiver," Solid-State Circuits, IEEE Journal of, vol. 40, pp. 1414-1425, July 2005" use a switch for band selection. Therefore, they can only receive one single band at a time, thus eliminating the advantages of simultaneous multi-frequency GNSS processing or ionospheric correction.

An example of a multi-frequency band receiver is also shown by the published application DE 102008026698 A1. The multi-frequency band receiver described includes a first path configured to process a first frequency band and a second frequency band, and a second path configured to process a third frequency band. The first frequency band and the second frequency band have a smaller distance than the first and the third as well as the second and the third frequency bands.

SUMMARY

According to an embodiment, a multi-frequency band receiver may have: a first receive path configured to receive and process a first code multiplex signal; a second receive path configured to receive and process a second code multiplex signal, the first receive path or the second receive path including an amplifier having a variable gain factor; a combiner configured to superpose the first processed code multiplex signal and the second processed code multiplex signal; a code multiplex baseband stage for processing the superposed code multiplex signal to acquire and use a first baseband receive signal and a second baseband receive signal, the first baseband receive signal representing data of the first code multiplex signal, and the second baseband receive signal representing data of the second code multiplex signal; and an amplifier controller configured to control the gain factor of the amplifier having a variable gain factor so that the first baseband receive signal or the second baseband receive signal includes a minimum reception quality which can be variably predetermined and is dependent on the operating state.

According to another embodiment, a method of receiving code multiplex signals with a multi-frequency band receiver may have the steps of: receiving and processing a first code multiplex signal in a first receive path; receiving and processing a second code multiplex signal in a second receive path, the first receive path or the second receive path including an amplifier having a variable gain factor; superposing the first processed code multiplex signal and the second processed code multiplex signal; processing the superposed code multiplex signal to acquire and use a first baseband receive signal and a second baseband receive signal, the first baseband receive signal representing data of the first code multiplex signal, and the second baseband receive signal representing data of the second code multiplex signal; and controlling the gain factor of the amplifier having a variable gain factor so that the first baseband receive signal or the second baseband receive signal has a minimum reception quality which can be variably predetermined and is dependent on the operating state.

Another embodiment may have a computer program including a program code for performing the method of receiving code multiplex signals with a multi-frequency band receiver, which method may have the steps of: receiving and processing a first code multiplex signal in a first receive path; receiving and processing a second code multiplex signal in a second receive path, the first receive path or the second receive path including an amplifier having a variable gain factor; superposing the first processed code multiplex signal and the second processed code multiplex signal; processing the superposed code multiplex signal to acquire and use a first baseband receive signal and a second baseband receive signal, the first baseband receive signal representing data of the first code multiplex signal, and the second baseband receive signal representing data of the second code multiplex signal; and controlling the gain factor of the amplifier having a variable gain factor so that the first baseband receive signal or the second baseband receive signal has a minimum reception quality which can be variably predetermined and is dependent on the operating state, when the computer program runs on a computer or microcontroller.

One embodiment in accordance with the invention provides a multi-frequency band receiver comprising a first receive path, a second receive path, a combiner, a code multiplex baseband stage and an amplifier controller. The first receive path is configured to receive and process a first code multiplex signal, and the second receive path is configured to receive and process a second code multiplex signal. The first receive path or the second receive path comprises an amplifier having a variable gain factor. The combiner is configured to superpose the first processed code multiplex signal and the second processed code multiplex signal. The code multiplex baseband stage is configured to process the superposed code multiplex signal to obtain and use a first baseband receive signal and a second baseband receive signal. The first baseband receive signal represents data of the first code multiplex signal, and the second baseband receive signal represents data of the second code multiplex signal. In addition, the amplifier controller is configured to control the gain factor of the amplifier having a variable gain factor so that the first baseband receive signal or the second baseband receive signal comprises a minimum reception quality which can be variably predetermined and is dependent on the operating state.

Embodiments in accordance with the invention are based on the core idea that by amplifying one of the two code multiplex signals in the receive paths, or both code multiplex signals independently of each other, in a targeted manner, the reception quality of baseband receive signals may be influenced. This may be explained, for example, in that by positively amplifying a code multiplex signal, a signal-to-noise ratio of the associated baseband receive signal may be improved, but that, conversely, the signal-to-noise ratio of the other baseband receive signal will be degraded. By means of negative gain or attenuation, a reverse effect may be provoked. By means of this variable control of the reception quality of the baseband receive signals, different requirements placed upon the reception quality of the different baseband receive signals in different operating states of the multi-frequency band receiver may be taken into account. For example, it may be the case that in one operating state, the first baseband receive signal is to exist in as high a reception quality as possible, whereas the second baseband receive signal may be used in a low reception quality only, whereas in another operating state, the reverse case is desired. These different requirements made in the various operating states of the multi-frequency band receiver may be taken into account by the described control of the gain factor of the amplifier, whereby the overall performance of the multi-frequency band receiver may be improved.

Some embodiments in accordance with the invention include a reception quality determiner, which determines a reception quality of the first baseband receive signal or a reception quality of the second baseband receive signal. The amplifier controller may then control the gain factor on the basis of the determined reception quality of the first baseband receive signal or of the second baseband receive signal. By detecting the reception quality of that baseband receive signal which is to have the minimum reception quality which can be variably predetermined and is dependent on the operating state, it is possible to react to changing reception conditions in that the amplifier controller adapts the gain factor accordingly. Particularly with mobile multi-frequency band receivers, the reception conditions may constantly change due to the changing environment, which may be taken into account by the concept described.

Further embodiments in accordance with the invention include an operating state controller. On the basis of an operating state of the multi-frequency band receiver, the operating state controller can predetermine a value of the minimum reception quality which can be variably predetermined and is dependent on the operating state.

Some embodiments in accordance with the invention relate to a satellite navigation receiver having a multi-frequency band receiver in accordance with the concept described.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
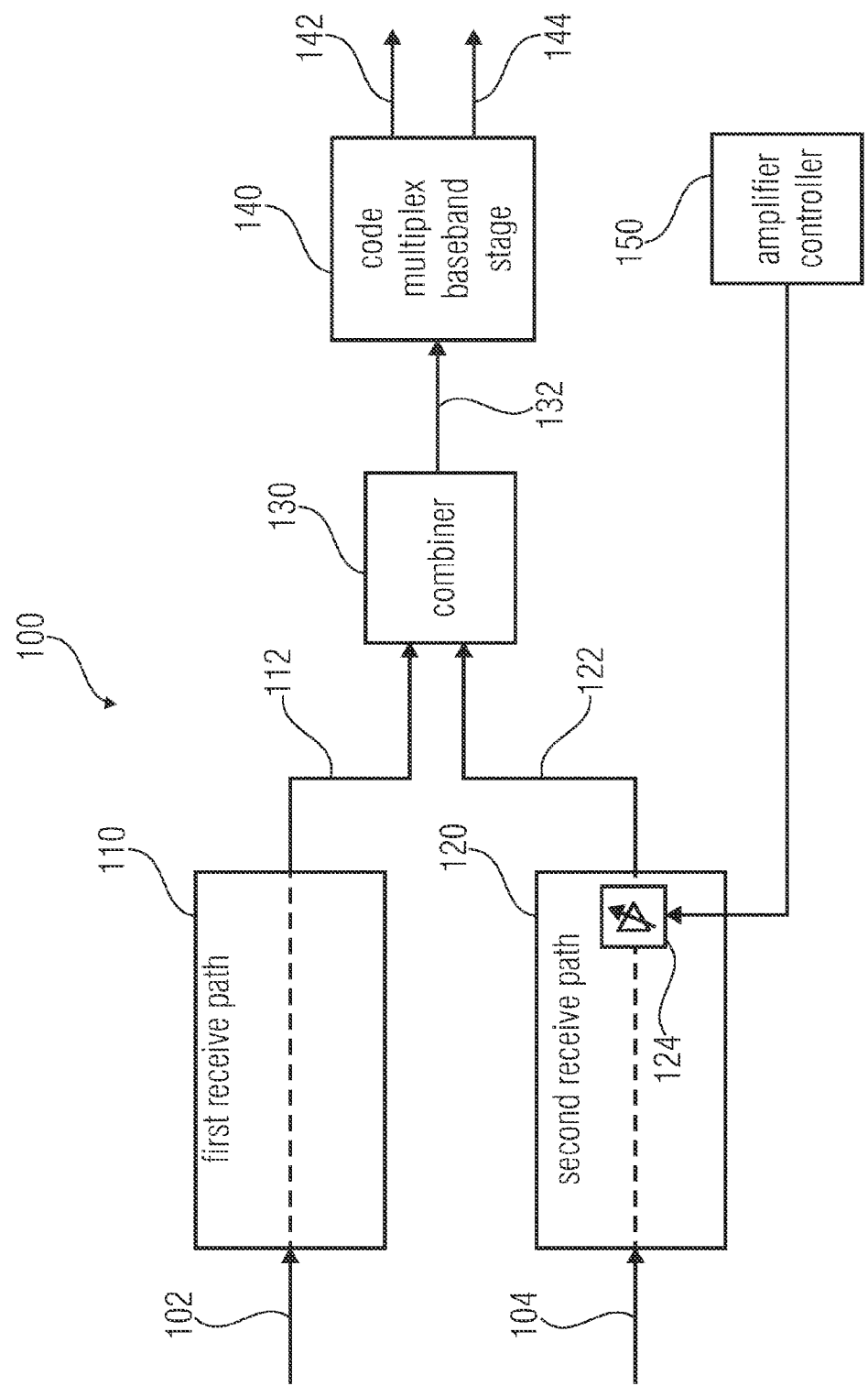
FIG. 1a shows a block diagram of a multi-frequency band receiver.

In the following, identical reference numerals will sometimes be used for objects and functional units having identical or similar functional properties. Moreover, optional features of the various embodiments may be combined with one another or may be mutually exchangeable.

FIG. 1a shows a block diagram of a multi-frequency band receiver 100 in accordance with an embodiment of the invention. The multi-frequency band receiver 100 includes a first receive path 110, a second receive path 120, a combiner 130, a code multiplex baseband stage 140, and an amplifier controller 150. Additionally, the first receive path 110 or the second receive path 120 comprises an amplifier 124 having a variable gain factor. The first receive path 110 and the second receive path 120 each are connected to the combiner 130. In addition, the combiner 130 is connected to the code multiplex baseband stage 140, and the amplifier controller 150 is connected to the amplifier 124.

The first receive path 110 receives and processes a first code multiplex signal 102, and the second receive path 120 receives and processes a second code multiplex signal 104. In addition, the combiner 130 superposes the first processed code multiplex signal 112 and the second processed code multiplex signal 122. The code multiplex baseband stage 140 processes the superposed code multiplex signal 132 to obtain and use a first baseband receive signal 142 and a second baseband receive signal 144. The first baseband receive signal 142 represents data of the first code multiplex signal 102, and the second baseband receive signal 144 represents data of the second code multiplex signal 104. Moreover, the amplifier controller 150 controls the gain factor of the amplifier 124 having a variable gain factor, so that the first baseband receive signal 142 or the second baseband receive signal 144 comprises a minimum reception quality which can be variably predetermined and is dependent on the operating state.

The first receive path 110 and the second receive path 120 may receive the code multiplex signals 102, 104 e.g. from a shared antenna or from two independent antennas.

The code multiplex signals 102, 104 may have been produced, for example, in accordance with a code multiplex method (code division multiple access, CDMA) or a discrete sequence spread spectrum method (direct sequence spread spectrum, DSSS). As a result, the data of the different code multiplex signals may be separated from one another by the code multiplex baseband stage 140 despite superposition within the combiner 130, and they may be used or provided as independent baseband receive signals.

The amplifier 124 shown in FIG. 1a is arranged in the second receive path 120 in this example. However, the amplifier 124 may also be arranged in the first receive path 110. Alternatively, both receive paths may comprise an amplifier 124 having a variable gain factor. The gain controller 150 may then control the gain factor of the amplifier of the first receive path 110 independently of the gain factor of the amplifier of the second receive path 120, so that the first baseband receive signal 142 or the second baseband receive signal 144 comprises the minimum reception quality which can be variably predetermined and is dependent on the operating state.

The reception quality of the baseband receive signals may be influenced by the variable gain of signals in the first receive path 110 or in the second receive path 120. Due to the superposition of the code multiplex signals by the combiner 130, the reception qualities of the baseband receive signals extracted therefrom are dependent on one another. For example, if the signal is positively amplified in the first receive path, the reception quality of the first baseband receive signal 142 will improve. Conversely, the reception quality of the second baseband receive signal 144 will degrade. If a signal is negatively amplified in the first receive path, which corresponds to an attenuation, an inverse change in the reception qualities of the baseband receive signals will result. Therefore, the reception qualities of the different baseband receive signals may be adapted for the respective operating state of the multi-frequency band receiver by controlling the gain factor of the amplifier 124 in a targeted manner.

Figure 1B:
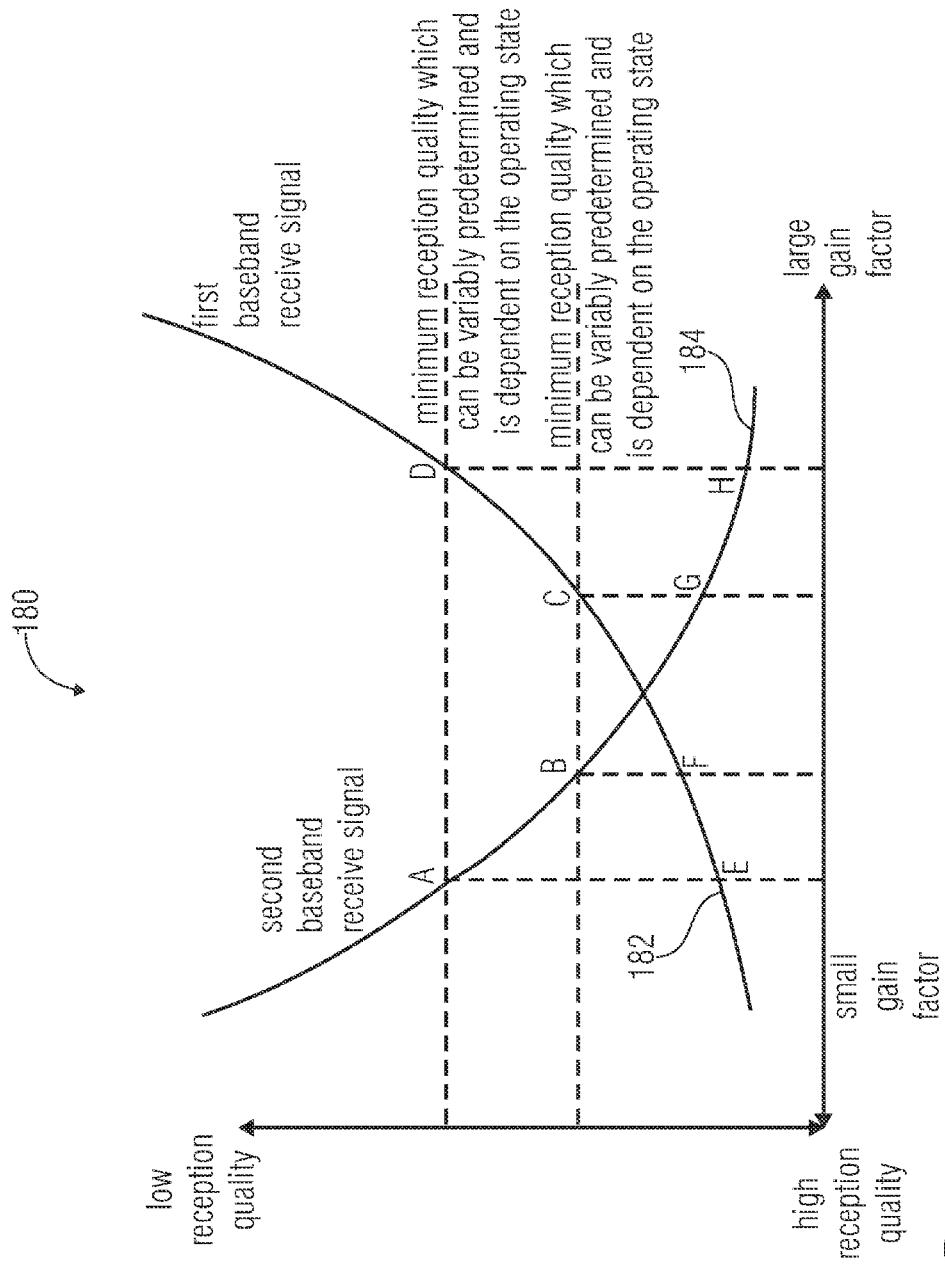
FIG. 1b shows a schematic representation of the influence of the gain factor on the reception quality of the first and second baseband receive signals.

This circumstance is schematically shown in FIG. 1b, for example. FIG. 1b shows an example 180 of the effect of a change in the gain factor on the reception quality of the first and second baseband receive signals. In this context it shall be assumed that the amplifier 124 is located in the second receive path 120, as is shown in FIG. 1a. If the amplifier controller 150 controls the gain factor toward a high gain factor, the reception quality of the second baseband receive signal 144 will increase. Conversely, small gain factors will result in a decrease in the reception quality of the second baseband receive signal 144. This behavior 184 is depicted by the curve extending from the top left to the bottom right. In contrast, the first baseband receive signal 142 exhibits an inverse behavior 182. It exhibits a high reception quality for small gain factors, and a low reception quality for high gain factors. This behavior 182 is represented by the curve extending from the bottom left to the top right. The behavior depicted results, e.g., from the respective different levels of influence of the noise of one signal on the other. Additionally, the two horizontal broken lines indicate two examples of minimum reception qualities which can be variably predetermined and are dependent on the operating state. For example, in one operating state of the multi-frequency band receiver, a low reception quality of the second baseband receive signal 144 may be sufficient. This may be realized by controlling the gain factor to have a value which corresponds to the point A. Conversely, one may achieve thus a relatively high reception quality of the first baseband receive signal 142, as is shown at point E. If, in a different operating state of the multi-frequency band receiver, a higher reception quality may be used for the second baseband receive signal 144, the gain factor will have to be increased, e.g. up to point D. As a result, the reception quality of the first baseband receive signal 142 will degrade, as is shown at point F. Conversely, in one operating state, a minimum reception quality which can be variably predetermined and is dependent on the operating state may be used for the first baseband receive signal 142, as is shown at points C and D. In accordance with the above description, this also influences the reception quality of the second baseband receive signal 144.

By adjusting the gain factor such that one of the two baseband receive signals will only achieve the minimum reception quality which is dependent on the operating state, the reception quality in the other baseband receive signal may be clearly increased as compared to known methods.

It is also possible for the minimum reception quality, which can be variably predetermined and is dependent on the operating state, for a baseband receive signal in one operating state to be so high that the other baseband receive signal can only be received with a reception quality that is lower than the minimum reception quality which can be variably predetermined and is dependent on the operating state. This would be the case in FIG. 1*b*, for example, if for the second baseband receive signal a minimum reception quality which can be variably predetermined and is dependent on the operating state may be used which would be at points G or H. For the first baseband receive signal, at least a reception quality corresponding to points C or D would then be possible on the basis of the concept described.

In other words, by changing the gain factor of the amplifier, a ratio, e.g. of a signal-to-noise ratio of the first baseband receive signal 142 and of a signal-to-noise ratio of the second baseband receive signal 144 to each other, may be changed. More specifically, by predetermining a first value of the minimum reception quality, which can be variably predetermined and is dependent on the operating state, for the first baseband receive signal 142 or the second baseband receive signal 144, the respectively other baseband receive signal will have a first value of its reception quality, and by predetermining a second value of the minimum reception quality, which can be variably predetermined and is dependent on the operating state, for the first baseband receive signal 142 or the second baseband receive signal 144, the respectively other baseband receive signal will have a second value of its reception quality. In this context, the first value of the reception quality of the other baseband receive signal will be smaller than the second value of the reception quality of the other baseband receive signal if the first value of the minimum reception quality which can be variably predetermined and is dependent on the operating state is larger than the second value of the minimum reception quality which can be variably predetermined and is dependent on the operating state.

In addition, it is possible for the amplifier controller 150 to control the gain factor, so that the first baseband receive signal 142 or the second baseband receive signal 144 has a minimum reception quality which can be variably predetermined and is dependent on the operating state, and the respectively other baseband receive signal has a reception quality that is larger than the minimum reception quality which can be variably predetermined and is dependent on the operating state.

The reception quality of a baseband receive signal may be characterized, for example, by a signal-to-noise ratio (SNR), a summed noise, superposition noise losses, edge steepness of signal edges, jitter, frequency accuracy, accuracy of times or any other quantity enabling evaluation of the reception quality. For example, in satellite navigation systems, a position can be determined all the more accurately, the more accurately the correlation tips can be detected in terms of time. The accuracy of temporal detection is proportional to the noise (i.e. the reception quality) of the signal, and therefore the accuracy of the position determination is proportional to the noise of the signal.

The first and second receive paths receive and process the code multiplex signals. In this context, the first receive path 110 may process the first code multiplex signal 102, for example, so that the first processed code multiplex signal 112 comprises frequencies within a baseband of the code multiplex baseband stage 140. Likewise, the second receive path 120 may process the second code multiplex signal 104, so that the second processed code multiplex signal 122 comprises frequencies within the baseband of the code multiplex baseband stage 140. In other words, the receive paths may be configured to down-convert received code multiplex signals to the baseband of the code multiplex baseband stage 140. Additionally, the receive paths may also comprise, e.g., amplifiers and filters for processing the received code multiplex signals.

The amplifier 124 having a variable gain factor is, for example, an analog or digital voltage-controlled amplifier (VCA) or a current-controlled amplifier, which is controlled by a signal of the amplifier controller 150. The amplifier controller 150 may be part of the code multiplex baseband stage 140 or, as is shown in FIG. 1*a*, it may be an independent hardware unit.

The code multiplex baseband stage 140 may use the baseband receive signals for evaluating the data contained (e.g. for error correction), or may use the baseband receive signals for providing same to a subsequent digital processor (DSP) for evaluation.

In addition, the multi-frequency band receiver 100 may comprise an oscillator stage for providing a local oscillator signal. In this connection, the first receive path 110 may include a mixer that can be supplied with the local oscillator signal, and the second receive path 120 may comprise a mixer which can also be supplied with the local oscillator signal. The received code multiplex signals may be down-converted by the mixers in the receive paths. Alternatively, the mixers may be implemented as in-phase quadrature-phase mixers in the receive paths. The oscillator stage may then provide the local oscillator signal such that it has an in-phase component and a quadrature-phase component, which may be supplied to the in-phase quadrature-phase mixer in the first receive path 110 and to the in-phase quadrature-phase mixer in the second receive path 120.

Optionally, the multi-frequency band receiver 100 may comprise an in-phase quadrature-phase architecture. The first receive path 110 may have an in-phase output and a quadrature-phase output, and the second receive path 120 may also have an in-phase output and a quadrature-phase output, and the code multiplex baseband stage 140 may have an in-phase input and a quadrature-phase input. The combiner 130 may superpose a signal at the in-phase output of the first receive path 110 and a signal at the in-phase output of the second receive path 120, and provide same to the code multiplex baseband stage 140 at the in-phase input. Similarly, the combiner 130 may superpose a signal at the quadrature-phase output of the first receive path 110 and a signal at the quadrature-phase output of the second receive path 120, and provide same to the code multiplex baseband stage 140 at the quadrature-phase input.

By means of the concept described, a multi-frequency band receiver may be realized on the basis of path superposition with regulation possibilities, for example.

Figure 2:
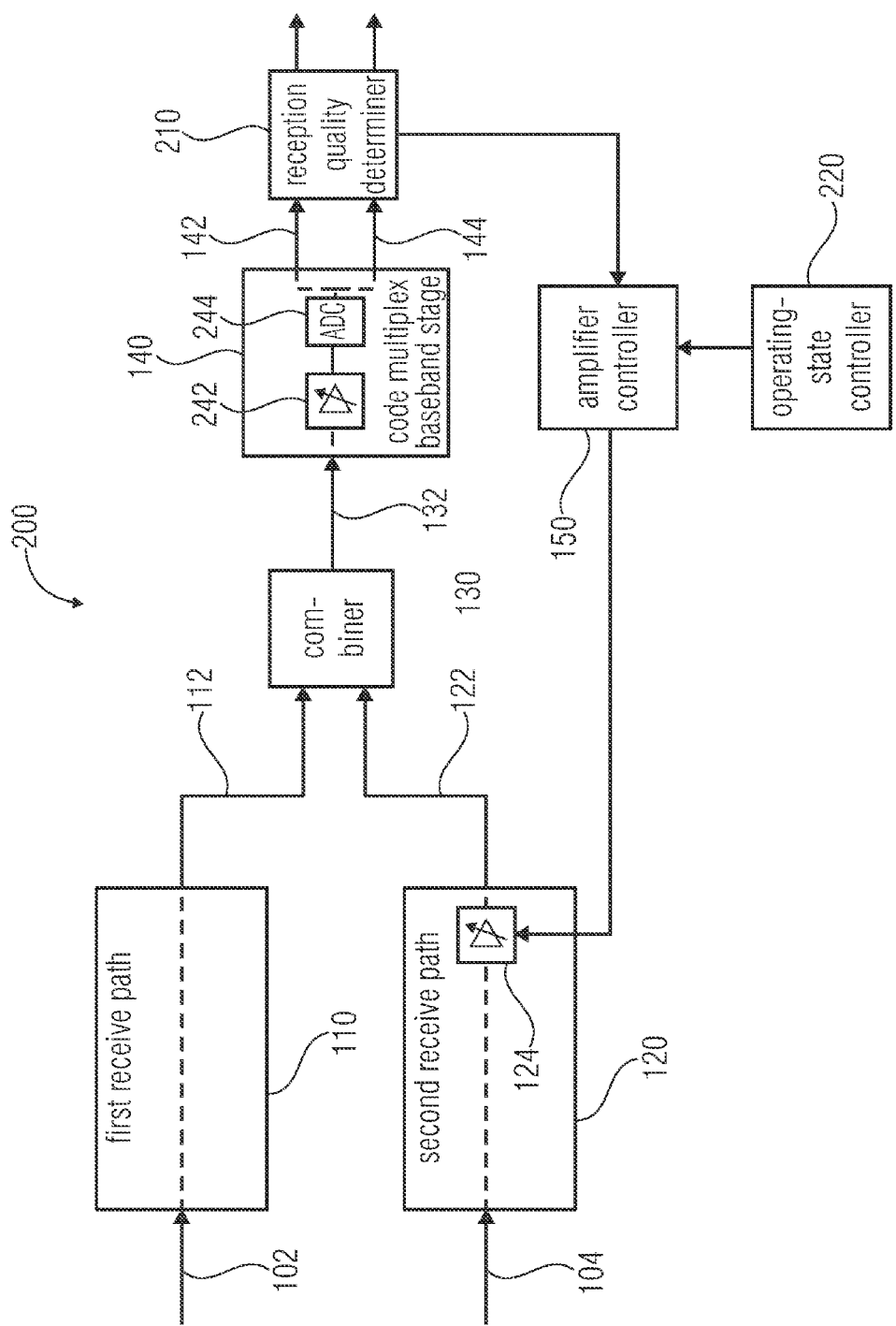
FIG. 2 shows a block diagram of a multi-frequency band receiver.

FIG. 2 shows a block diagram of a multi-frequency band receiver 200 in accordance with an embodiment of the invention. The structure of the multi-frequency band receiver 200 is similar to the structure of the multi-frequency band receiver shown in FIG. 1a; however, it additionally comprises a reception quality determiner 210 and an operating state controller 220. Moreover, the code multiplex baseband stage 140 includes an amplifier 242 having a variable gain factor connected to an analog-to-digital converter (ADC) 244. The reception quality determiner 210 and the operating state controller 220 are connected to the amplifier controller 150, and the code multiplex baseband stage 140 provides the first baseband receive signal 142 and the second baseband receive signal 144 to the reception quality determiner 210. Alternatively, the reception quality determiner 210 may also be part of the code multiplex baseband stage 140 and may have the baseband receive signals provided to it internally. Likewise, the operating state controller 220 may also be part of the code multiplex baseband stage 140.

For example, the reception quality determiner 210 may determine the reception quality of the baseband receive signals. The latter may then be compared, for example, to the minimum reception quality which can be variably predetermined and is dependent on the operating state, and the amplifier controller 150 may, e.g., dynamically adapt the gain factor so that one of the baseband receive signals will have the minimum reception quality which can be variably predetermined and is dependent on the operating state. In other words, the reception quality determiner 210 may determine a reception quality of the first baseband receive signal 142 and/or a reception quality of the second baseband receive signal 144. The amplifier controller 150 may then control the gain factor of the amplifier 124 on the basis of the determined reception quality of the first baseband receive signal 142 or of the determined reception quality of the second baseband receive signal 144.

Alternatively, in the simple version of a multi-frequency band receiver, the amplifier controller 150 may adjust the gain factor to a fixed, predetermined value on the basis of an operating state of the multi-frequency band receiver. In this manner, the reception quality determiner would not be necessary, but it would not be possible to respond to fluctuating reception conditions and, therefore, to achieve the overall performance of the multi-frequency band receiver that may be achieved with a reception quality determiner. In this example, the fixedly predetermined values may be selected such that the minimum reception quality, which can be variably predetermined and is dependent on the operating state, that is achieved by a baseband receive signal has a large safety distance from a minimally used reception quality for the baseband receive signal so as to be able to allow fluctuations of the reception conditions.

The operating state controller 220 may then establish, e.g., an operating state of the multi-frequency band receiver, and on the basis thereof may predetermine a value of the minimum reception quality which can be variably predetermined and is dependent on the operating state. The operating state controller may be connected to a user interface, for example, or may monitor internal processes so as to ascertain an operating state of the multi-frequency band receiver. In other words, the operating state controller 220 may predetermine a value of the minimum reception quality, which can be variably predetermined and is dependent on the operating state, on the basis of an operating state of the multi-frequency band receiver. Values of the minimum reception quality, which can be variably predetermined and is dependent on the operating state, may be stored, e.g., for different operating states in a memory. Alternatively, it is also possible for values to be stored for different operating states, on which the value of the minimum reception quality, which can be variably predetermined and is dependent on the operating state, depends in a deterministic manner. For example, the value of the minimum reception quality, which can be variably predetermined and is dependent on the operating state, of a baseband receive signal may slightly fluctuate around the constant value stored, since under changing reception conditions of in the event of switching between operating states, the amplifier controller 150 takes a certain amount of time for readjusting the gain factor of the amplifier 124.

In FIG. 2, the superposed code multiplex signal 132 that is provided by the combiner is converted to a digital signal by an analog-to-digital converter 244. The analog-to-digital converter 244 is configured to process input signals having voltages between a minimum voltage and a maximum voltage (e.g. 0 to 1 volt, 0 to 5 volts or any other voltage range). The superposed code multiplex signal 132 should be adapted to this operating range of the analog-to-digital converter 244. In order not to limit the range within which the amplifier 124 having a variable gain factor of the receive path may amplify (in order not to leave the operating range of the analog-to-digital converter), the code multiplex baseband stage 140 may also comprise an amplifier 242 having a variable gain factor. The amplifier 242 of the code multiplex baseband stage 140 may then adapt the superposed code multiplex signal 132 to the admissible voltage range or the operating range of the analog-to-digital converter 244. In other words, the amplifier 242 having a variable gain factor of the code multiplex baseband stage 140 may amplify the superposed code multiplex signal 132 (may positively or negatively amplify it, i.e. also attenuate it) and provide it to the analog-to-digital converter 244, so that a maximum voltage of the amplified superposed code multiplex signal is adapted to an operating range of the analog-to-digital converter 244.

The reception quality determiner 210, the operating state controller 220 as well as the amplifier 242 and the analog-to-digital converter 244 of the code multiplex baseband stage 140 may all be jointly incorporated in a multi-frequency band receiver, as is shown in FIG. 2. Alternatively, however, multi-frequency band receivers may just as well comprise only one or two of the additional functions described.

Figure 3:
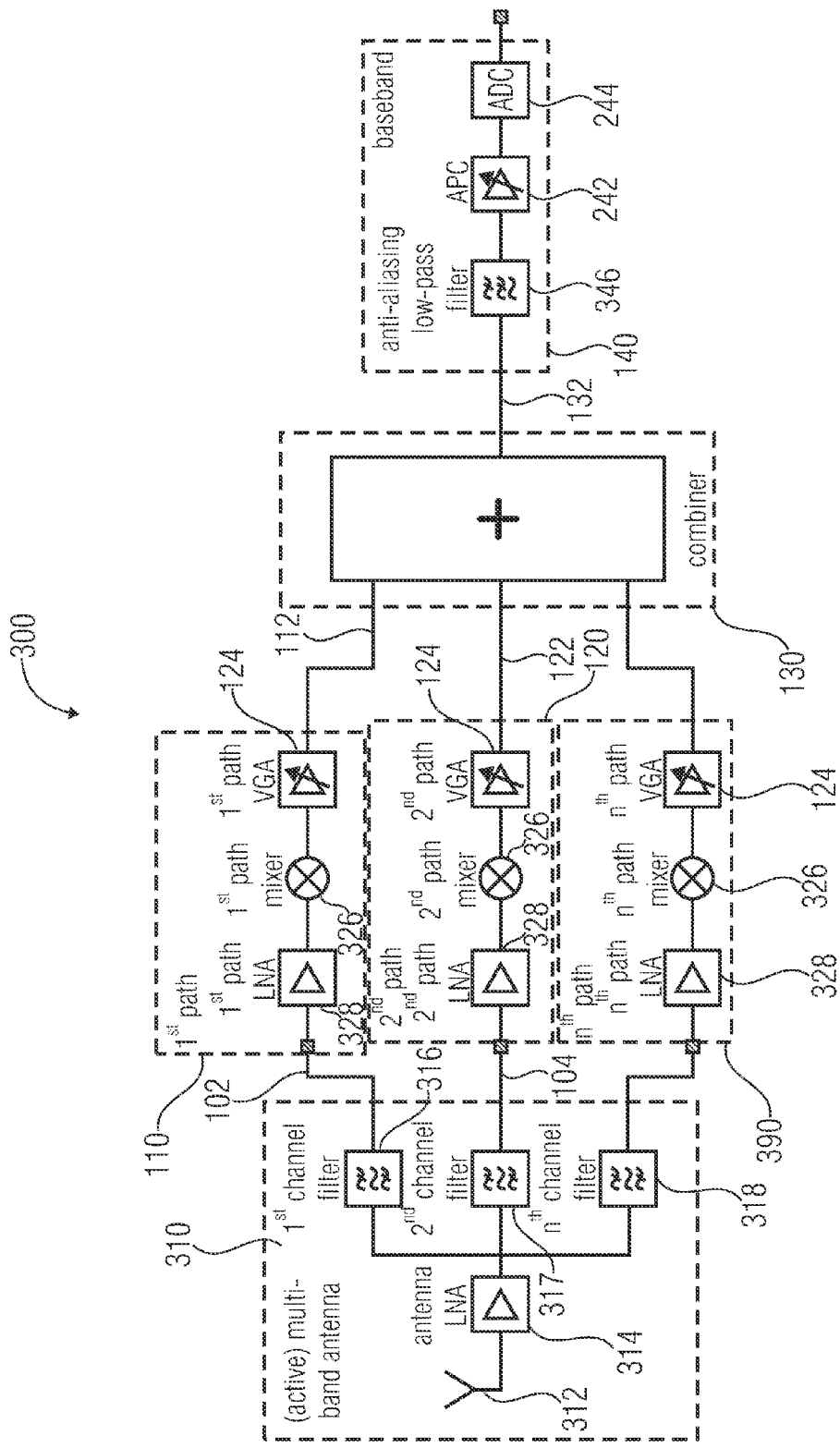
FIG. 3 shows a block diagram of a multi-frequency band receiver.

So far, multi-frequency band receivers having two receive paths have been described. However, the inventive concept may just as well be expanded to include any number of receive paths. In this context, FIG. 3 shows a block diagram of a multi-frequency band receiver 300 in accordance with an embodiment of the invention. The structure of the multi-frequency band receiver 300 is similar to the structure of the multi-frequency band receiver shown in FIG. 1a. However, an $n^{th}$ receive path 390 and an antenna stage 310 or (active) multi-band antenna are additionally shown. The antenna stage 310 is connected to the receive paths, and the receive paths are connected to the combiner 130. The antenna stage 310 comprises an antenna, a low-noise amplifier (LNA) 314 of the antenna, and for each receive path one channel filter 316, 317, 318. The antenna 312 is connected to the low-noise amplifier 314 of the antenna, and the low-noise amplifier 314 is connected to the channel filters 316, 317, 318. The first channel filter 316 is connected to the first receive path 110, the second channel filter 317 is connected to the second receive path 120, and the $n^{th}$ channel filter 318 is connected to the $n^{th}$ receive path 390.

Each of the receive paths includes an amplifier 124 having a variable gain factor, which is controlled by an amplifier controller not shown in FIG. 3. Alternatively, only some of the receive paths may comprise an amplifier 124 having a variable gain factor. For example, the amplifier 124 of precisely one receive path may be dispensed with since a gain of the signals in the other receive paths in relation to the receive path having no amplifier may be influenced.

In addition, a low-noise amplifier 328 and a mixer 326 are shown in FIG. 3 for each receive path. The low-noise amplifier of each path is connected to the respective channel filter of the antenna stage 310 on one side and to the associated mixer 326 on the other side, the mixer 326 is connected to the respective amplifier 124 having a variable gain factor, and the amplifier 124 having a variable gain factor is connected to the combiner 130.

In addition, the code multiplex baseband stage 140 includes, as was already shown in FIG. 2, an amplifier 242 having a variable gain factor and an analog-to-digital converter 244 as well as, additionally, an anti-aliasing low-pass filter 346. The anti-aliasing low-pass filter 346 is connected to the combiner 130 on one side, and on the other side to the amplifier 242 having a variable gain factor of the code multiplex baseband stage 140, and the amplifier 242 is connected to the analog-to-digital converter 244.

The $n^{th}$ receive path 390 is to indicate that the multi-frequency band receiver 300 may have any number (e.g. 3, 4, 5, 8, 10 or generally N) of receive paths. In other words, a multi-frequency band receiver may comprise a number of N receive paths for receiving N code multiplex signals, at least N-1 receive paths of the N receive paths each comprising an amplifier having a variable gain factor. In this context, the combiner 130 may superpose the code multiplex signals of the N receive paths, and the code multiplex baseband stage 140 may obtain N baseband receive signals on the basis of the superposed code multiplex signal. In addition, the amplifier controller may control the gain factor of each amplifier of the at least N-1 receive paths, so that at least one of the baseband receive signals comprises a minimum reception quality which can be variably predetermined and is dependent on the operating state.

Some embodiments in accordance with the invention relate to a satellite navigation receiver or a mobile radio receiver which include a multi-frequency band receiver in accordance with the concept described.

For example, the code multiplex baseband stage in a satellite navigation receiver may use the baseband receive signals for an ionospheric correction. In other words, the code multiplex baseband stage may perform an ionospheric correction of the first baseband receive signal and of the second baseband receive signal, for example, on the basis of the first baseband receive signal and of the second baseband receive signal.

In a mobile radio receiver, the code multiplex baseband station may optimize, by means of the concept described, e.g. the reception quality by using at least two different baseband receive signals (from different mobile radio bands).

In the example of the satellite navigation receiver, e.g., the first code multiplex signal may represent a first frequency band of a satellite signal, and the second code multiplex signal may represent a second frequency band of the satellite signal. The frequency bands may have different bandwidths. For example, the first frequency band may have a larger bandwidth than the second frequency band. This applies to the Galileo E1 (small bandwidth) and E5 (large bandwidth) bands, for example.

Consequently, it is also possible for the first baseband receive signal to have a larger bandwidth than the second baseband receive signal. In satellite navigation receivers, one may use a narrow-band signal, for example, in an initialization phase (acquisition) for finding the navigation satellites, and one may use a wide-band signal in a localization phase (tracking) for enabling more precise localization. It may also be important that both signals exist with a sufficient level of quality all the time. In addition, it may be of interest to obtain one of the two signals in as high a quality as possible, in which case the other signal is not to fall below a minimum reception quality, however. For example, a loss of the narrow-band signal in the localization phase may entail a renewed initialization phase at a later point in time. On the other hand, one wants to have the wide-band signal in as high a quality as possible, since the localization accuracy may be proportional to the reception quality of the wide-band signal.

In other words, it may be of interest that the amplifier controller controls the gain factor in an initialization phase, so that the second baseband receive signal (in this example the narrow-band signal) comprises a first value of the reception quality which can be variably predetermined and is dependent on the operating state, and controls the gain factor in a localization phase, so that the second baseband receive signal comprises a second value of the minimum reception quality which can be variably predetermined and is dependent on the operating state, the first value of the minimum reception quality which can be variably predetermined and is dependent on the operating state being higher than the second value of the minimum reception quality which can be variably predetermined and is dependent on the operating state, so that a reception quality of the first baseband receive signal (in this example, the wide-band signal) in the localization phase is higher than a reception quality of the first baseband receive signal in the initialization phase.

For example, a receive path may be turned down, so that there will nevertheless be information from this path. For example, in a Galileo navigation system, the E1 signal having originally 45 dBHz might be attenuated with −7 dB in a localization phase (tracking) if, e.g., 38 dBHz in the baseband is sufficient for obtaining the signal with a minimum reception quality. In this manner, the E5 signal might be relieved, for example. If the E1 signal were no longer received at all, or if it fell below a minimum reception quality, it would no longer be possible to perform an ionospheric correction, for example. In addition, renewed initialization (acquisition) might be useful.

An ionospheric correction may be performed, for example for the Galileo satellite navigation system, by means of the following equations:

$$\rho_{IF} = \frac{f_{E1}^2}{(f_{E1}^2 - f_{E5}^2)}\rho_{E1} - \frac{f_{E5}^2}{(f_{E1}^2 - f_{E5}^2)}\rho_{E5}$$

$$\rho_{IF} = 2.33\rho_{E1} - 1.33\rho_{E5}$$

$$\rho \approx T_c\sqrt{\frac{d}{4C/N_0T}}$$

$f_{E1}$ designates the Galileo E1 frequency of 1575.42 MHz, $f_{E5}$ designates the Galileo E5 frequency of 1192 MHz, $\rho_{IF}$ designates the ionosphere-free pseudo distance measurement, $\rho_{E1}$ designates the pseudo distance measurement E1, $\rho_{E5}$ designates the pseudo distance measurement E5, $T_C$ designates the chip rate (for E1=1.023 MHz, for E5=10.23 MHz), d designates the discriminator distance (e.g. 0.1), T designates the integration time (e.g. 100 ms), and $C/N_O$ designates the signal-to-noise spacing in relation to a bandwidth of 1 Hz (e.g. 40 dBHz).

The multi-frequency band receiver might also comprise, e.g., a third receive path for receiving and processing a third code multiplex signal witz a further amplifier having a variable gain factor. The combiner might then superpose the first to third code multiplex signals, and the code multiplex baseband stage might additionally obtain and use a third baseband receive signal, the third baseband receive signal representing data of the third code multiplex signal. The amplifier controller may then control the gain factor of the amplifier and the gain factor of the further amplifier, so that at least two baseband receive signals of the first to third baseband receive signals comprise a minimum reception quality which can be variably predetermined and is dependent on the operating state (may have different or identical values for the at least two baseband receive signals).

In this manner, three different satellite navigation bands might be processed simultaneously, e.g., and the reception qualities might be optimized such that as accurate a position determination as possible may be effected. Alternatively, the third code multiplex signal may represent a mobile radio signal, for example. Then, e.g., the reception qualities of the different baseband receive signals may be optimized, by means of the concept described, such that both mobile radio reception and as accurate a position determination as possible may be effected.

In this manner, one may react to a variable change in the reception situation, e.g. incoming or outgoing call in the UMTS (universal mobile telecommunication system) network or any other mobile radio network, or a more accurate position determination.

Additionally, with the concept proposed it may be possible to enable a seemingly sole activation of said paths or deactivation of other paths by means of a high gain or attenuation.

Figure 4A:
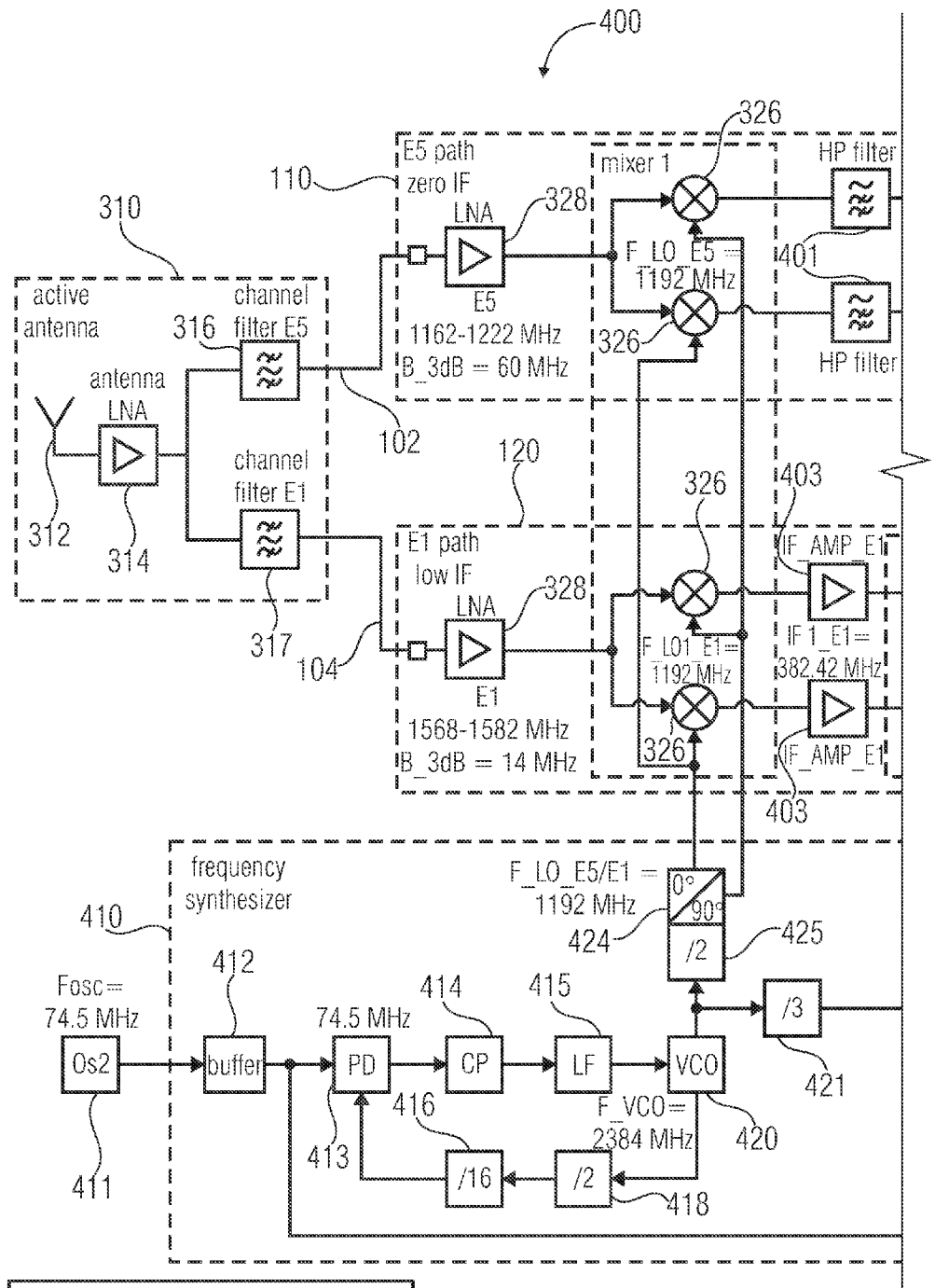
FIG. 4 shows a block diagram of a multi-frequency band receiver.

FIG. 4 shows a block diagram of a multi-frequency band receiver 400 in accordance with an embodiment of the invention. The structure of the multi-frequency band receiver 400 is similar to that of the multi-frequency band receiver shown in FIG. 3, but has only two receive paths. Additionally, the multi-frequency band receiver 400 comprises an in-phase quadrature-phase architecture. Therefore, the mixers 326, 404 are implemented as in-phase quadrature-phase mixers. In addition, some other elements of the multi-frequency band receiver 400, such as the amplifier 124 having a variable gain factor of the second receive path (E1 path), the anti-aliasing filter 346, the amplifier 242 having a variable gain factor of the code multiplex baseband stage 140, and the analog-to-digital converter 244, for example, are present in a two-fold implementation for the in-phase branch and the quadrature-phase branch.

In addition, the first receive path (E5 path) comprises, downstream from the mixer 326, one high-pass filter 401, respectively, followed by one amplifier 402 in the in-phase and quadrature-phase branches, respectively. Between the mixer 326 and the amplifier 124 having a variable gain factor, the second receive path 120 additionally includes one amplifier 403 in each of the in-phase and quadrature-phase branches, and an in-phase quadrature-phase mixer 404. The combiner 130 includes a first summing unit 432 for superposing the in-phase signals and a second summing unit 434 for superposing the quadrature-phase signals.

Moreover, the multi-frequency band receiver 400 comprises an oscillator stage 410 providing oscillator signals for the mixers 326, 404 of the receive branches and the analog-to-digital converters 244 of the code multiplex baseband stage 140. By means of the oscillator stage 410 (or frequency synthesizer), all of the oscillator signals needed may be made available. To this end, the oscillator stage 410 includes a reference oscillator 411, the reference oscillator signal of which may be used, e.g., directly or following a buffer 412 for controlling the analog-to-digital converters in the baseband stage. Furthermore, the reference oscillator is connected to the buffer 412, from which the reference oscillator signal is passed on to a phase detector 413, which is part of a phase-locked loop of a voltage-controlled oscillator 420. At a second input of the phase detector 413, there is the oscillator signal of the voltage-controlled oscillator 420, which was previously divided by 32 (as is shown by the two divisors 416, 418). Following the phase detector 413, a charge pump (CP) 414 and a loop filter 415 are arranged which provide a signal with which the voltage-controlled oscillator 420 is controlled. The voltage-controlled oscillator 420 provides a basic oscillator signal, which, on the one hand, creates a first local oscillator signal by a "divided by two" divisor 425, and on the other hand, on the basis of the basic oscillator signal, in another branch the basic oscillator frequency may be divided by 6 (as is shown by the two divisors 421, 422), and in this manner, a second local oscillator signal may be produced. The first local oscillator signal may then be provided to the first mixers 326 of the receive paths, and the second local oscillator signal may be provided to the second mixer 404 of the second receive path 120. Both local oscillator signals may be made available by the oscillator stage 410 for the in-phase quadrature-phase mixers 326, 404 as an in-phase signal and as a signal shifted in phase by, e.g., 90° (as is shown by the two phase members 424, 423).

Alternatively, in the oscillator stage shown, the "divided by two" divisors 425, 423, 418 may be saved when use is made of a voltage-controlled oscillator 420 having a base frequency that is divided by two accordingly.

The example shown in FIG. 4 generally shows a multi-frequency band receiver, but the figure additionally depicts an application as a satellite navigation receiver in the Galileo satellite navigation system by indicating bands and frequencies. However, the receiver shown may be used just as well for other satellite navigation systems or generally different applications such as mobile radio systems, for example, if the components of the multi-frequency band receiver are adapted to the corresponding frequency bands.

Some embodiments in accordance with the invention relate to a multi-band GNSS (global navigation satellite system) front-end architecture (architecture of the input-side component), which is also suited for integrated circuits, for example.

Figure 5:
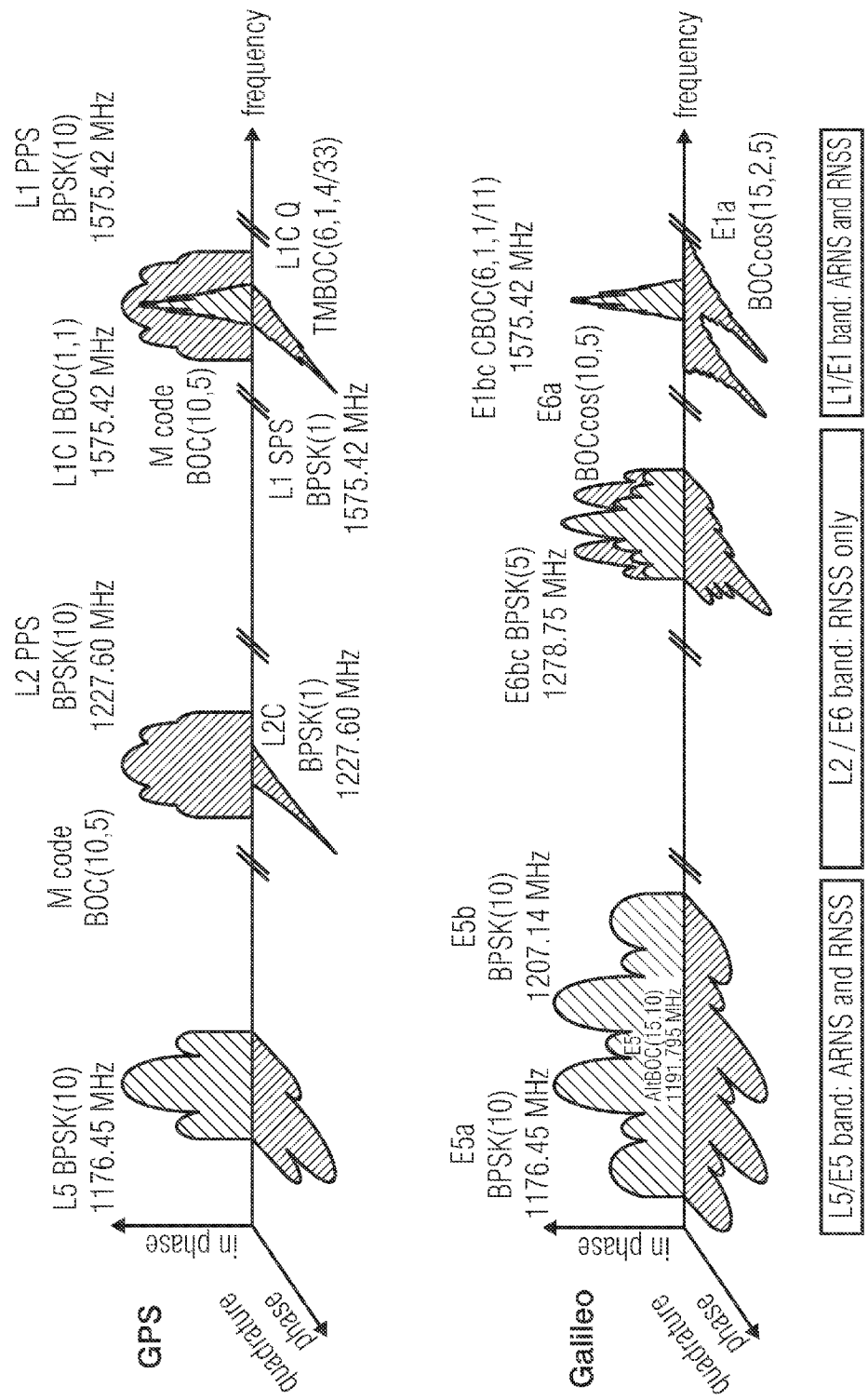
FIG. 5 shows a schematic representation of GPS and Galileo signals.

Several frequency bands come into question for the selection of a frequency band for a receiver of the advanced mass market. There are four frequency bands for which civilian GNSS signals are planned (see FIG. 5): L1 C/A, L1c/E1bc (GPS/Galileo); E6bc (Galileo); L2c (GPS); L5/E5[ab] (GPS/Galileo). All GNSS signals lie within the protected RNSS (radio navigation satellite services) band, but only the L1/E1 and the L5/E5 bands lie within the assigned spectrum for ARNS (aeronautical radio navigation services), which is even better protected. The other two GNSS bands, E6 and L2, which are protected by the RNSS only, are subject to radar, military transmissions and other potentially strong interferers (see ""Galileo Open Service Signal in Space Interface Control Document (OS SIS ICD), Draft 1," techn. rep., European Space Agency/European GNSS Supervisory Authority, February 2008").

For fast detection, typically the relatively narrow-band signals (GPS C/A with BPSK(1) modulation and/or Galileo E1bc with BOC(1.1) modulation) of L1 and E1, respectively, are used. The resulting Doppler and chip delay estimation may subsequently be used for high-performance tracking with the wide-band signals L1/E1 MBOC(6,1,1/11), L5/E5a BPSK(10), E5b BPSK(10) or all of the E5 AltBOC(15,10) signals. In accordance with "J.-M. Sleewaegen, W. De Wilde, and M. Hollreiser, "Gallileo AltBOCReceiver," in Proc. Of ENC-GNSS 2004, Rotterdam, 2004", the standard deviation of the code measurement noise and of the multi-path code errors may be very small, especially for Galileo E5 AltBOC (15,10).

Finally, it is for the following reasons that the Galileo E5 band (including GPS L5, Galileo E5a and E5b) and the GPS/Galileo L1/E1 bands are suitable, e.g., for a multi-band GNSS receiver of the advanced mass market and may be selected for same:

One expects no or only well-known interferers, e.g. DME and TACAN, which lie within the E5 band. Fortunately, said pulsed interferences may be mitigated to a relatively high degree with pulse blanking strategies, as is set forth, for example, in "G. X. Gao, "DME/TACAN Interference and its Mitigation in L5/E5 Bands," in ION GNSS 20th International Technical Meeting of the Satellite Division, 25-28, September 2007, Fort Worth, Tex., 2007".

The signals in the selected bands are suited for fast detection while using the narrow-band L1/E1 signals and for the highest tracking accuracy while using the wide-band L5/E5 signals.

In addition, GNSS applications related to safety and the protection of human life may use an integrity signal such as that which is sent via the Galileo E1b and E5b bands.

All received GNSS signals are code division multiple access (CDMA) based signals having a negative signal-to-noise ratio (SNR) prior to the correlation. As will be shown below by simulation results, the two paths may be combined with each other, with acceptable signal degradation due to the superposition. The baseband portion shared by the overlapped L1/E1 and L5/E5 bands consists of two anti-aliasing low-pass filters, an automatic power control realized with two variable-gain amplifiers (VGA) and two analog-to-digital converters for in-phase and quadrature processing. This may considerably reduce the chip area, the pins and the power consumption.

To minimize the SNR degradation due to superposition of both paths, the power levels of said paths may be set as correctly as possible. As can be shown, when both paths are equally amplified, the combination will increase the noise floor and will therefore decrease, e.g., the SNR of E1 by 3 dB. At the same time, the noise floor of the E5 signal is increased by only about 0.9 dB due to the smaller filtered E1 bandwidth. The E5b signal located at +15.55 MHz IF will not be affected at all if the E1 filter exhibits adequate stop-band attenuation.

In at least one path, an additional variable-gain amplifier is needed to be able to control the noise floor power and thus the degradation between the L1/E1, E5 and L5/E5a signals, respectively. A noise floor calibration may be performed initially or any time the digital control algorithm requests it. One possible calibration method may be implemented in the digital domain by independently measuring the noise variance of each path when the other one is switched off. When both variances are known, the gain correction can be set accordingly.

When only one signal path is needed, e.g. the L1/E1 GPS/Galileo, during the detection phase or initialization phase (acquisition phase), the other path may be turned off (or seemingly turned off in that the other path is highly amplified). The SNR degradation due to the increment of the noise floor and the power consumption of the unused path will be eliminated. This helps in degraded signal environments and may also be regarded as an energy saving mode. In the subsequent tracking phase or localization phase, when both bands are used, the SNR degradation between L1/E1 and E5/E5a/L5 may be controlled by an additional VGA (e.g. the E1_VGA in FIG. 4).

Figure 6:
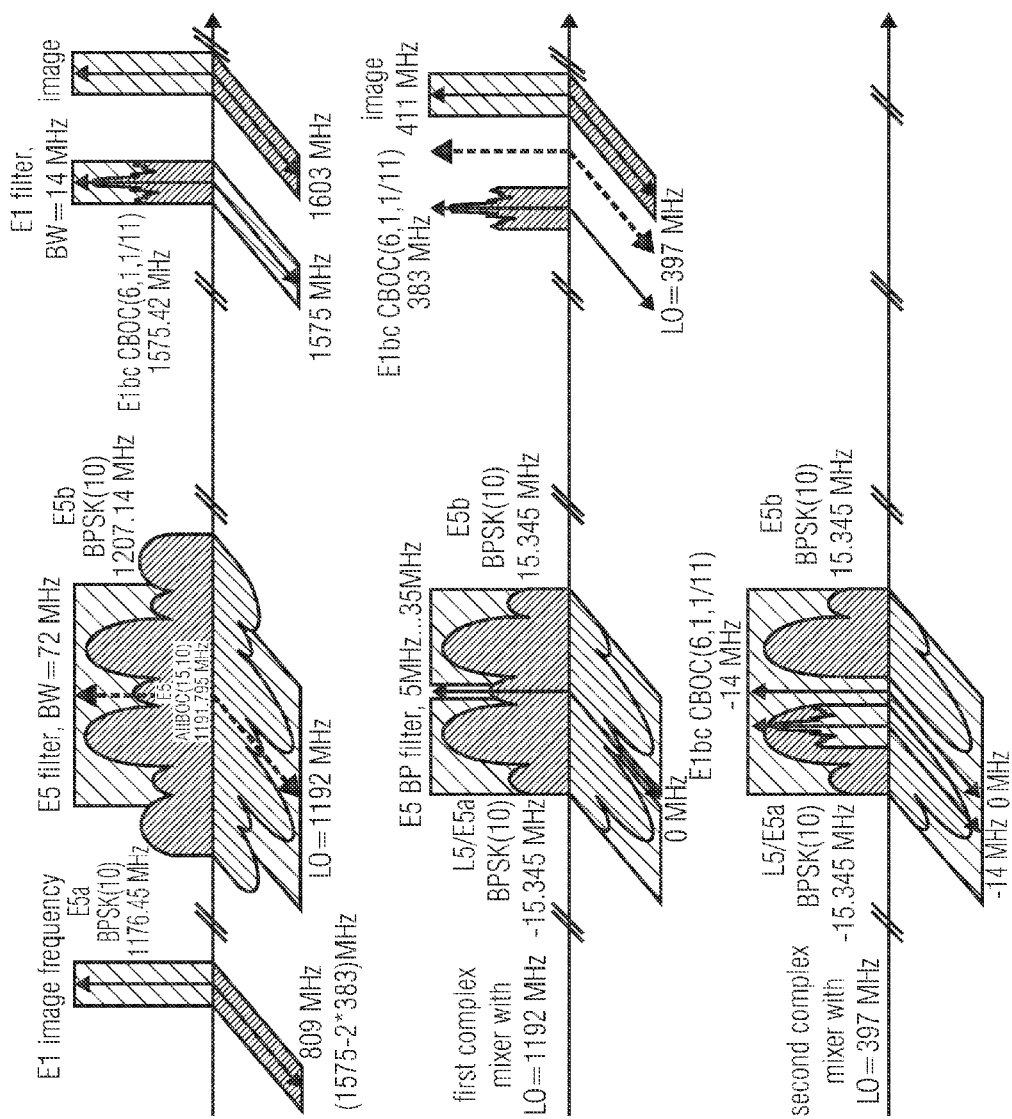
FIG. 6 shows a schematic representation of a down-conversion of signals and their intermediate frequencies.

FIG. 6 shows an example of the signal down-conversion and of its intermediate frequencies for a multi-frequency band receiver as is shown in FIG. 4, for example. Additionally, the following table provides an overview of GNSS signals received, including their corresponding bandwidths and intermediate frequencies (IF).

| GNSS Signal | Carrier Frequency [MHz] | Modulation | RX Bandwidth [MHz] | IF [MHz] |
| --- | --- | --- | --- | --- |
| GPS L1 C/A | 1575.42 | BPSK(1) | 14 | −13.913 |
| GPS L1c | 1575.42 | TMBOC(6,1,4/33) | 14 | −13.913 |
| Galileo E1bc | 1575.42 | CBOC(6,1,1/11) | 14 | −13.913 |
| Galileo E5 | 1191.795 | AltBOC(15,10) | 70 | −0.205 |
| Galileo E5a | 1176.45 | BPSK(10) | 32 | −15.55 |
| GPS L5 | 1176.45 | BPSK(10) | 32 | −15.55 |
| Galileo E5b | 1207.14 | BPSK(10) | 32 | +15.14 |

The first column of the table indicates the names of various GNSS signals, the second column indicates the carrier frequencies of the GNSS signals in MHz, the third column indicates the modulation of the GNSS signals, the fourth column indicates receive bandwidths (RX bandwidths) of the GNSS signals in MHz, and the fifth column indicates resulting intermediate frequencies of the GNSS signals.

Figure 7:
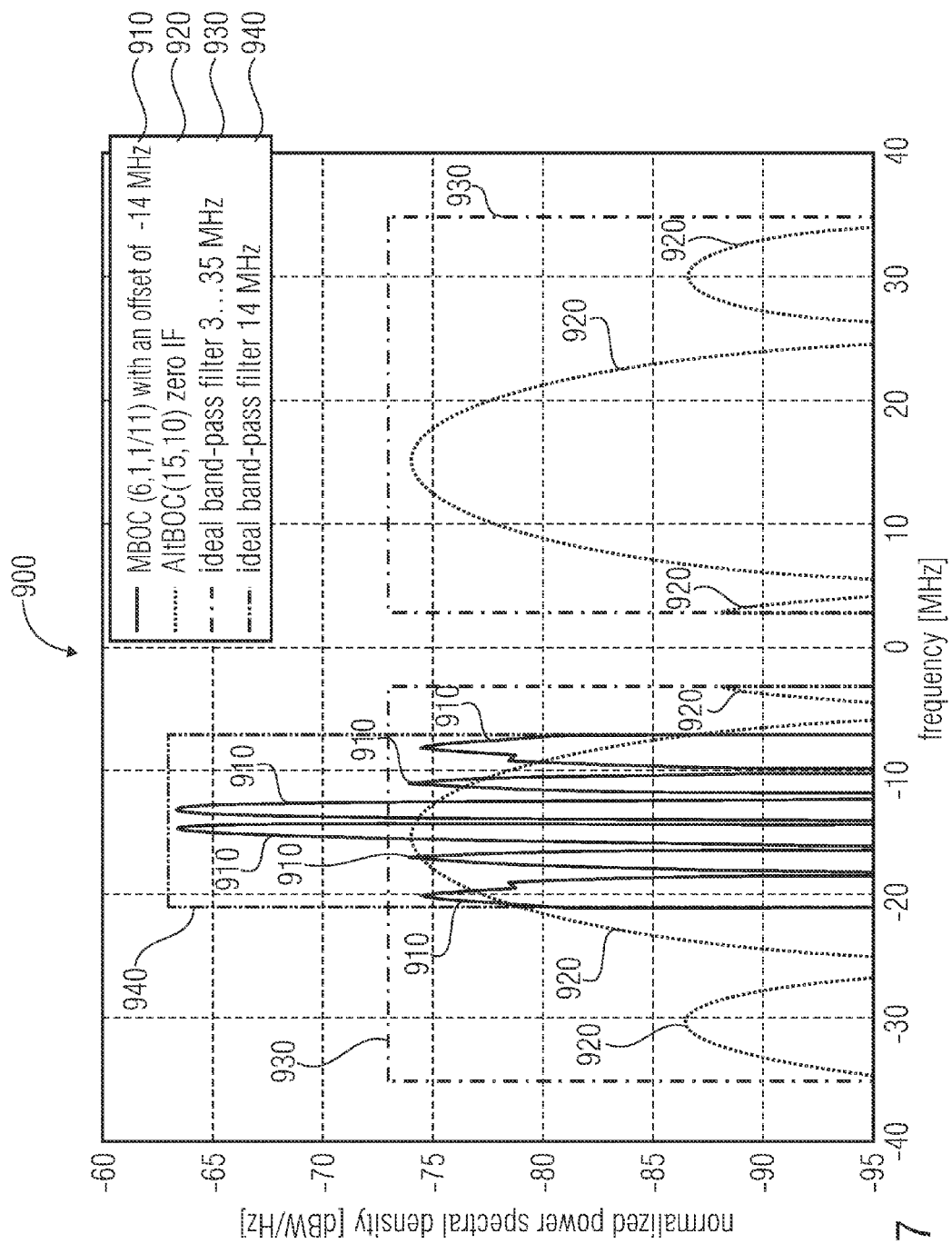
FIG. 7 shows a schematic representation of a filtered baseband signal (Galileo E5 and E1)

FIG. 7 shows a schematic representation 900 of filtered baseband signals for MBOC (6, 1, 1/11) with an offset 910 of −14 MHz and for AltBOC (15, 10, 0-IF 920) while additionally depicting the behavior of an ideal band-pass filter of 3-35 MHz 930 and of an ideal band-pass filter with 14 MHz 940. The normalized power spectral density is shown in dBW/Hz at varying frequencies in MHz.

The spectral separation coefficient (SSC) can be used for quantifying the interference between two signals. The SSC measures the level of orthogonality between two signals. If the PSDs do not overlap, e.g. are separated by distant frequency bands, the SSC will approach zero. The PSDs of signals BOCsin, MBOC and AltBOC are indicated in equations 2, 3 and 1. All of them are normalized to unity over infinite bandwidth. According to "E. D. Kaplan and C. J. Hegarty, Understanding GPS: Principles and Application, Second Edition, Artech House, 2006", the SSC can be computed with the following, for example:

$$SSC = \int_{-\infty}^{\infty} S_s(f) S_i(f) df \quad (4)$$

For the present case, this equation is modified and extended with a frequency shift so as to take into account the different baseband IFs and with filters. The filter characteristics of the 3 MHz high-pass and 35 MHz low-pass filters ($|H_s|^2$) for E5 AltBOC and the 14 MHz-band-pass filter characteristic ($|H_i|^2$) for the E1 MBOC signal are used. Thus, the SSC may be computed as follows:

$$SSC = \int_{-\infty}^{\infty} |H_s|^2 S_s(f+f_{IF_s}) |H_i|^2 S_i(f+f_{IF_i}) df \quad (5)$$

The results of equation 5 are shown in the following table for different combinations of signal superposition. The table contains spectral separation coefficients (SSC) for different signal superpositions in dB/Hz.

|  | MBOC | MBOC$_{filtered}$ | MBOC$_{IF}$ | MBOC$_{filtered,IF}$ | AltBOC | AltBOC$_{filtered}$ |
| --- | --- | --- | --- | --- | --- | --- |
| MBOC | −65.66 | −65.66 | −86.90 | −87.55 | −84.04 | −90.54 |
| MBOC$_{filtered}$ | — | −65.66 | −87.55 | −88.29 | −84.59 | −93.67 |
| MBOC$_{IF}$ | — | — | −65.66 | −65.66 | −74.91 | −74.91 |
| MBOC$_{filtered,IF}$ | — | — | — | −65.66 | −74.93 | −74.93 |
| AltBOC | — | — | — | — | −76.51 | −76.59 |
| AltBOC$_{filtered}$ | — | — | — | — | — | −76.59 |

MBOC or AltBOC are the unlimited PSDs. The filtered versions (MBOC$_{filtered}$, AltBOC$_{filtered}$) include a 7 MHz low-pass for MOC and a 3 to 35 Hz band-pass for AltBOC. The IF indices indicate the shift of the MBOC PSD to the IF frequency of −14 MHz. The SSC of MBOC$_{filtered,IF}$ with AltBOC$_{filtered}$ is −74.93 dB/Hz. Compared to the self-interferences of AltBOC$_{filtered}$ with −76.59 dB/Hz, the superposition is only somewhat poorer. The MBOC$_{filtered}$ self-interference amounts to −65.66 dB/Hz, so that the superposition SSC is improved by 9.27 dB. The lowest spectral separation coefficient is given at −93.67 dB/Hz for AltBOC$_{filtered}$ and MBOC$_{filtered}$, since in this configuration, the PSDs hardly overlap. Thus, this would be the combination most desired, but such an IF concept is not possible without using a much more complicated frequency synthesizer than that proposed in FIG. 4, for example.

When using these SSC values, the effective C/N$_o$, can be calculated according to "E. D. Kaplan and C. J. Hegarty, Understanding GPS: Principles and Application, Second Edition, Artech House, 2006", for example:

$$\frac{C_s}{N_{0_{eff}}} = \frac{C_s}{N_0} \frac{\int |H_s|^2 S_s(f) df}{\int |H_s|^2 S_s(f) df + \frac{C_i}{N_0} SSC} \quad (6)$$

Now the SNR degradation can be determined with:

$$SNR_{loss} = \frac{C_s/N_0}{C_s/N_{0_{eff}}} = 1 + \frac{C_i}{N_0} \frac{SSC}{\int |H_s|^2 S_s(f) df} \quad (7)$$

In this case, given an SSC of about −75 dB/Hz and a realistic C$_i$/N$_0$ operating range between 20 and 45 dBHz, the superposition effect between the signals will be negligible (an SNR loss of less than 0.01 dB). However, this SNR superposition loss does not take into account the impact of the additional noise introduced by the combination of two paths (receive paths).

The noise bandwidth within E5 is 64 MHz (−35 to −3 MHz and +3 to +35 MHz). The E1 noise bandwidth is 14 MHz (−7 to +7 MHz). The combiner does not only add the signals, but also their noise floors. The increased noise floor (superposition noise) for E5 is:

$$\Delta_{E5} = 10\log_{10}\left(\frac{BW_{E5} + BW_{E1} \cdot VGA_{E1}}{BW_{E5}}\right) \quad (8)$$

and the superposition noise for E1 is:

$$\Delta_{E1} = 10\log_{10}\left(\frac{BW_{E5}|H_{14\,MHz}|^2 + BW_{E1} \cdot VGA_{E1}}{BW_{E1} \cdot VGA_{E1}}\right) \quad (9)$$

Assuming that the SNR and the gain for the E1 and the E5 paths are the same, and that no E1 VGA is present (VGA$_{E1}$=0 dB, see also FIG. 2), the filtered E1 signal with a bandwidth of 14 MHz gets all of the noise from the E5 path within its bandwidth. The SNR degradation of 3.01 dB for the E1 signal is obvious, since the noise floor within the E1 bandwidth has doubled. The noise within the wide-band E5 signal is increased on the E5a signal only, where the E1 IF signal overlaps. Therefore, the SNR degradation of 0.86 dB for the complete E5 signal is much lower. The degradation for the GPS L5 or the Galileo E5a signal, respectively, within −35 to −3 MHz bandwidth is 1.58 dB. There is no superposition noise degradation at all for the Galileo E5b signal.

Figure 8:
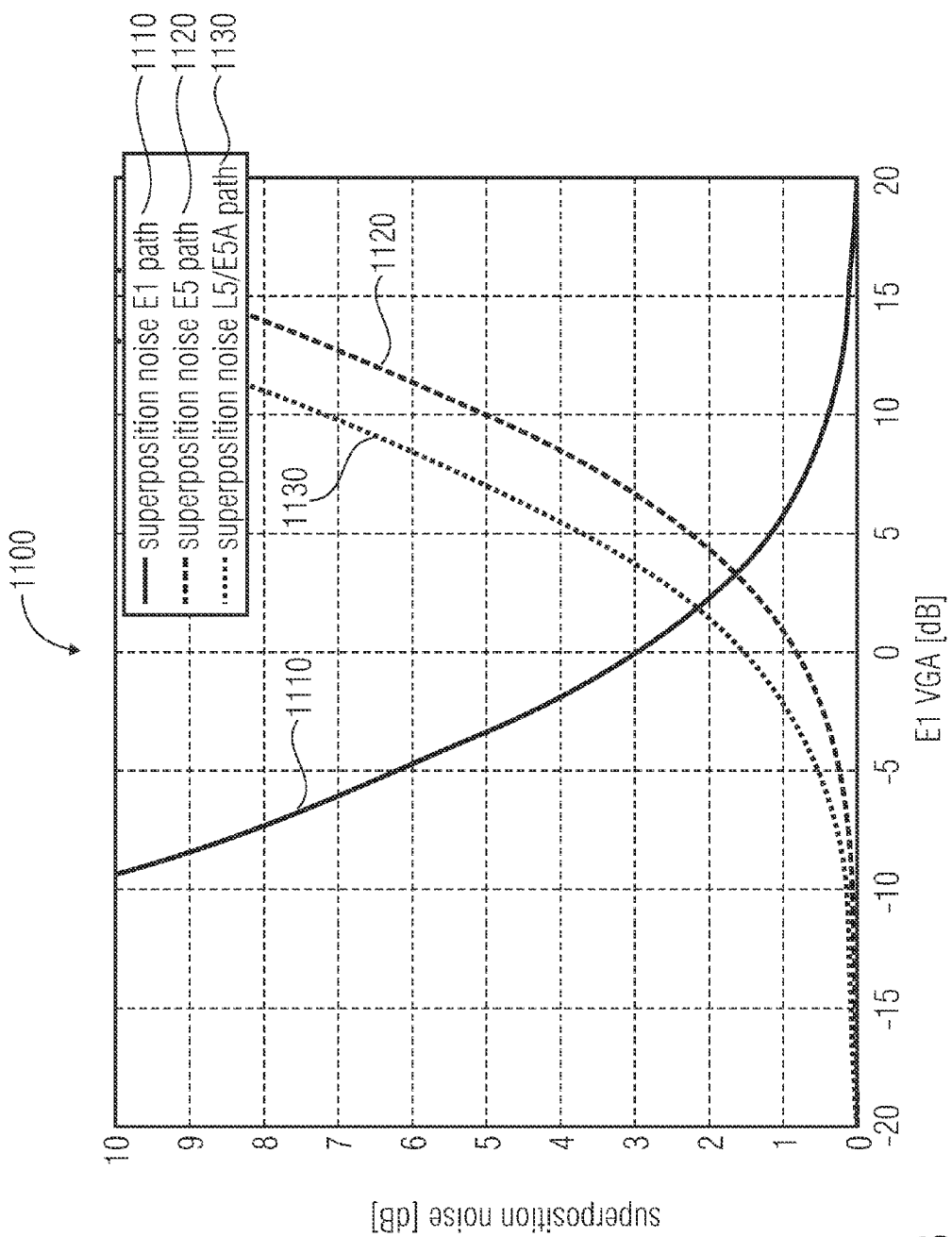
FIG. 8 shows a schematic representation of a superposition noise loss adjustable by an amplifier having a variable gain factor (with an amplifier having a variable gain factor in the E1 path)

FIG. 8 shows a schematic representation 1100 of a superposition noise, which may be adjusted by the amplifier having a variable gain factor, for the E1 path 1110, the E5 path 1120, and L5/E5a path 1130. The superposition noise is indicated in dB for different gains of the amplifier having a variable gain factor.

With the help of a variable-gain amplifier in one or both of the signal paths, the superposition noise may be adjusted. This is shown in FIG. 8 for an E1 VGA present in the E1 path, as is shown in FIG. 4. When both paths are used simultaneously, the minimal superposition noise loss for the E1 and E5 signals is 1.67 dB, the E1 VGA being set to a gain of 3.3. dB. The minimal superposition noise loss for the E1 and L5/E5a signals is 2.21 dB, the E1 VGA being set to a gain of 1.8 dB.

It has been shown that the SNR degradation caused by the superposition is low as compared to the savings which are made possible by this type of receiver architecture. In addition, the superposition degradation in at least one signal path (receive path) may be controlled while using a variable-gain element.

For example, the concept described enables a novel multi-band front-end architecture for the new wide-band GNSS signals. The latter enables simultaneous reception of both L1/E1 and L5/E5 GPS/Galileo bands having large bandwidths. The topology described (e.g. FIG. 4) is suited for integrated-circuit implementation. A zero-IF path and a low-IF path are combined with each other, which has the advantage that only one baseband circuitry may be used and that the number of components involved, the chip area and the power consumption are considerably reduced. Moreover, only one frequency synthesizer may be used for generating all inner frequencies.

The receiver architecture proposed enables providing a multi-frequency band receiver for the highly-developed mass market, e.g. the automobile market, where professional high-end receivers would be too expensive and too large and would consume too much power. However, the advantages listed above may entail great improvements or even enable some new applications.

The concept described proposes a new front-end architecture with simultaneous multi-band reception with shared utilization of many receiver blocks in the architecture. Thus, this architecture is efficient in terms of cost, size and power consumption with simultaneous reception of the wide-band bands Galileo E5, E1 and GPS L5, L1, and is therefore suited for integrated circuit solutions.

Due to the principle they are based on, CDMA systems have negative signal-to-noise ratios. It is only through a correlation with a replica of the spreading sequence in the receiver that the useful signal becomes usable again. This is why different CDMA signals, e.g. from different frequency bands, may be superposed in the receiver, which may save a lot of effort. However, the superposition results in that the overall noise increases. With the aid of adjustable amplifiers in at least one receive path prior to superposition, this additional superposition noise may be continuously adapted, depending on the requirement of the receive situation.

Figure 9:
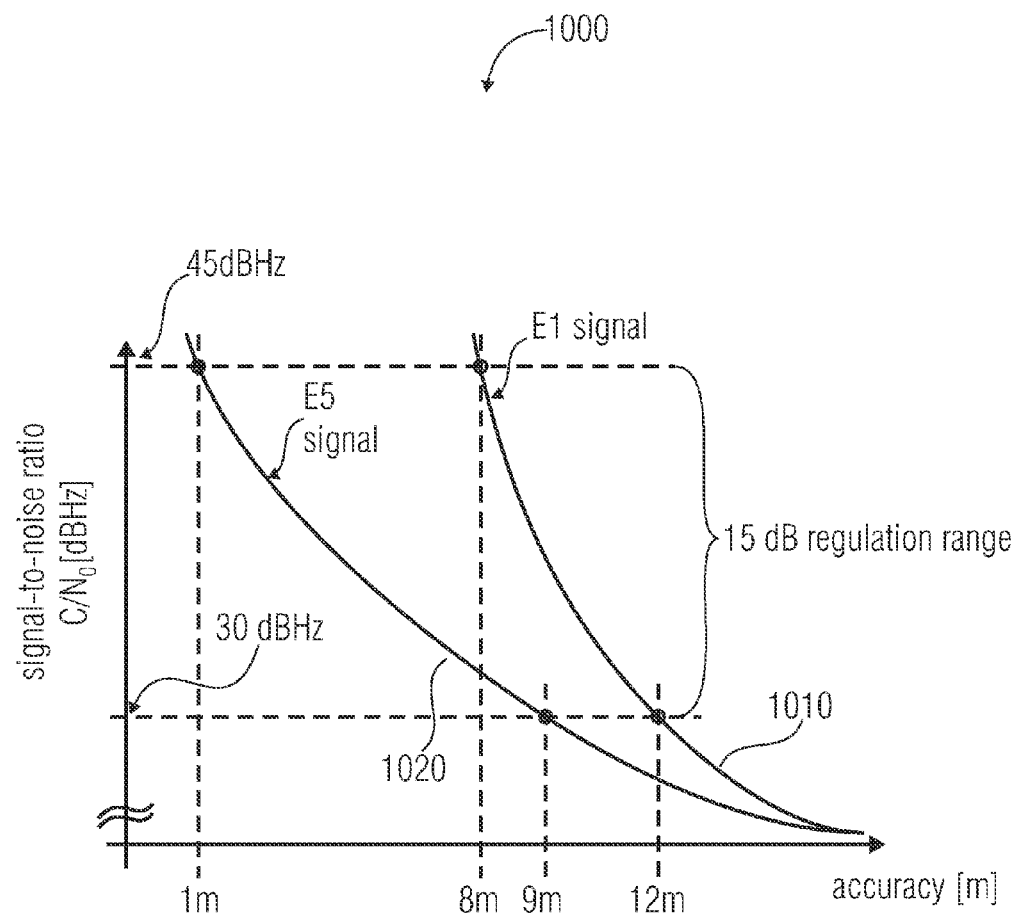
FIG. 9 shows a schematic representation of the achievable accuracy of position determination in dependence on the signal-to-noise ratio.

FIG. 9 shows an example of a possible dependence 1000 of the achievable accuracy of a position determination on the signal-to-noise ratio $C/N_O$. The two curves show the behavior 1010 of the E1 signal and the behavior 1020 of the E5 signal. In addition, the achievable accuracy of the position determination is indicated for two different signal-to-noise ratios which correspond, e.g., to a 15 dB regulation range of the multi-frequency band receiver.

Figure 10:
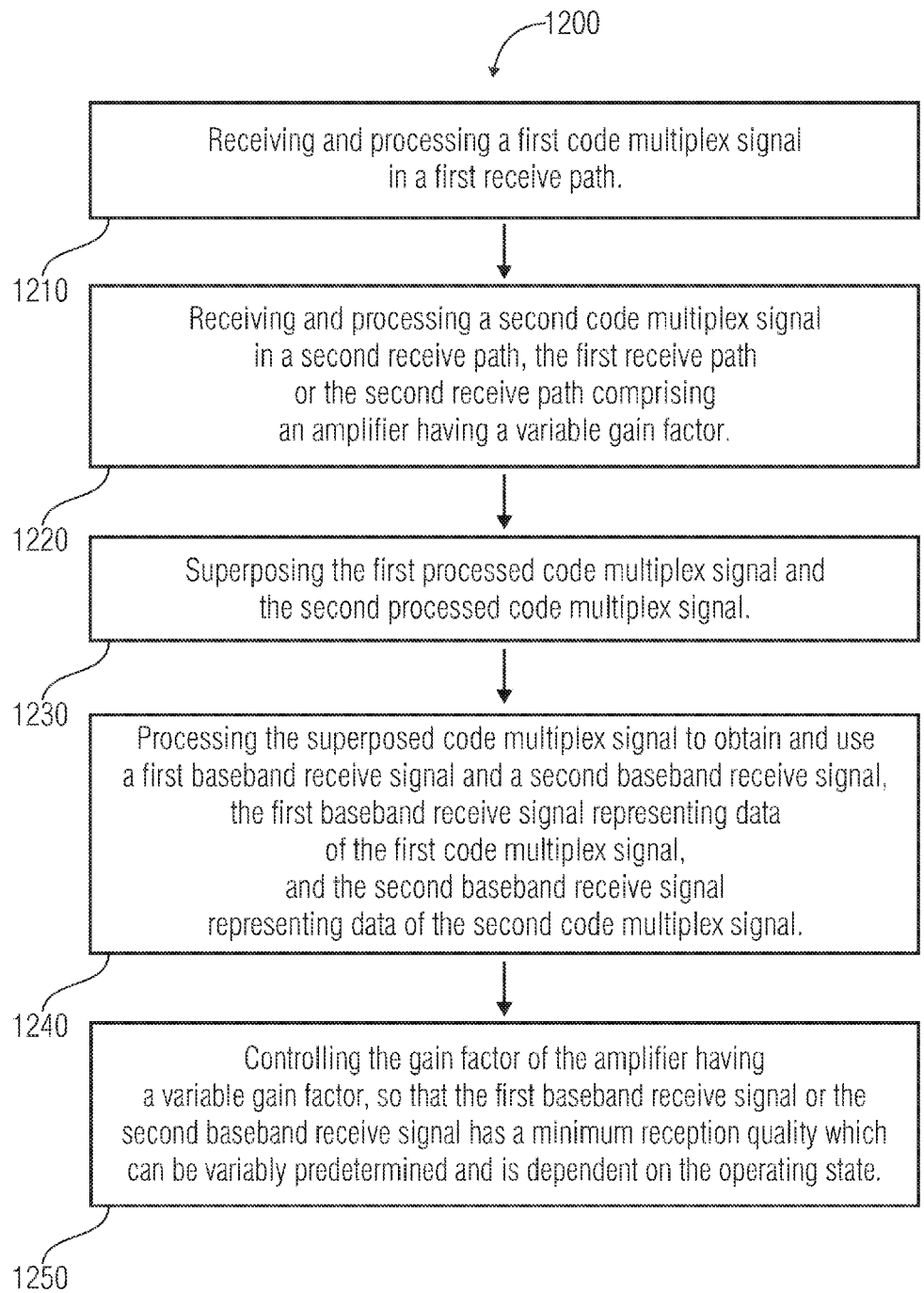
FIG. 10 shows a flowchart of a method of receiving signals with a multi-frequency band receiver.

FIG. 10 shows a flowchart of a method 1200 of receiving code multiplex signals with a multi-frequency band receiver in accordance with an embodiment of the invention. The method 1200 includes receiving and processing 1210 a first code multiplex signal in a first receive path and receiving and processing 1220 a second code multiplex signal in a second receive path. The first receive path or the second receive path comprises an amplifier having a variable gain factor. In addition, the method 1200 includes superposing 1230 the first processed code multiplex signal and the second processed code multiplex signal as well as processing 1240 the superposed code multiplex signal so as to obtain and use a first baseband receive signal and a second baseband receive signal. The first baseband receive signal represents data of the first code multiplex signal, and the second baseband receive signal represents data of the second code multiplex signal. Moreover, the method 1200 includes controlling 1250 the gain factor of the amplifier having a variable gain factor, so that the first baseband receive signal or the second baseband receive signal has a minimum reception quality which can be variably predetermined and is dependent on the operating state.

Some aspects of the invention will be described in more detail below. This will be done, for example, by means of an analysis of degradation effects of superposition signals, e.g. superposition loss and noise due to the combination of paths.

Figure 11A:
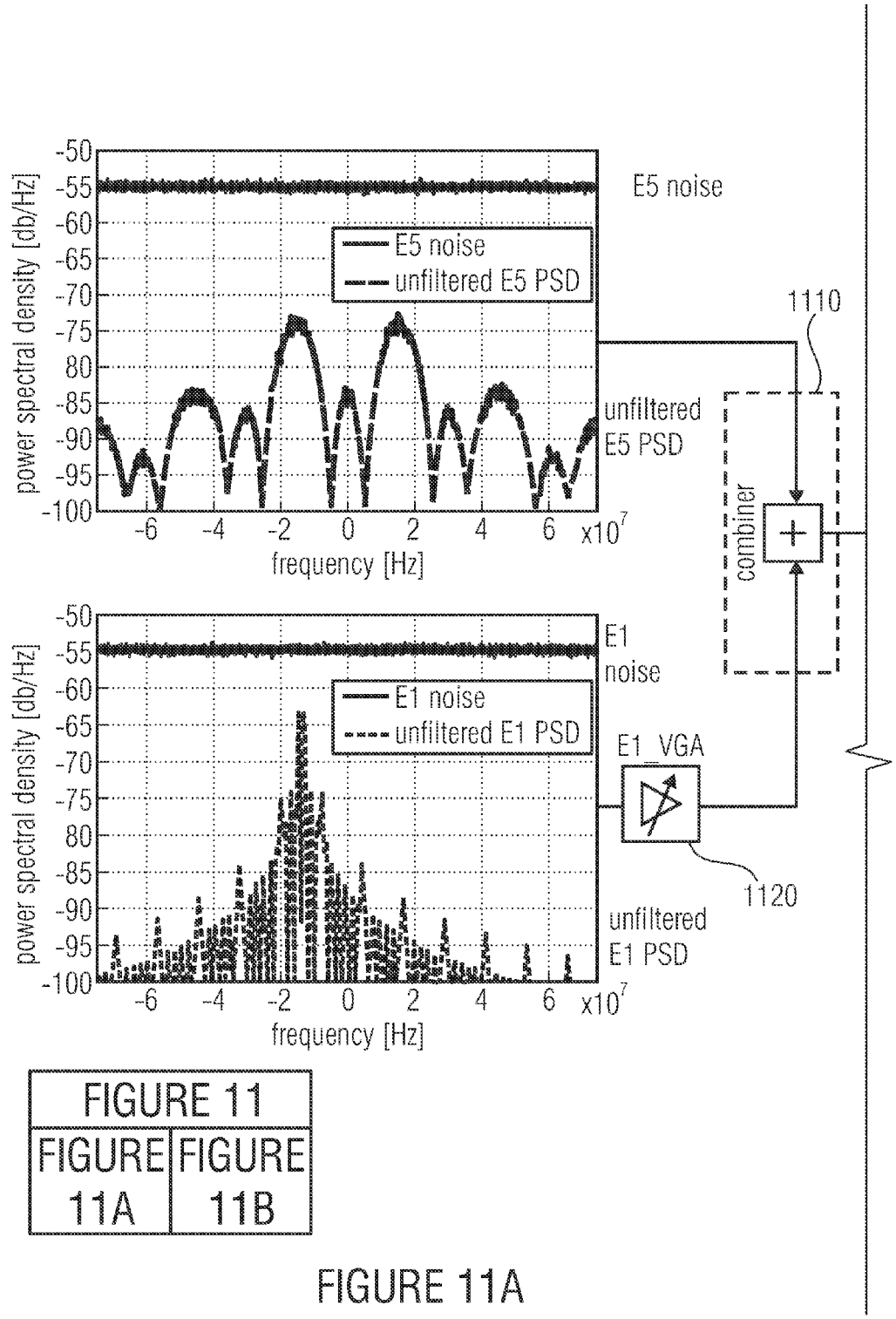
FIG. 11 shows a schematic representation of the superposition signal degradation effects in the form of a superposition of losses and noise.
Figure 11B:
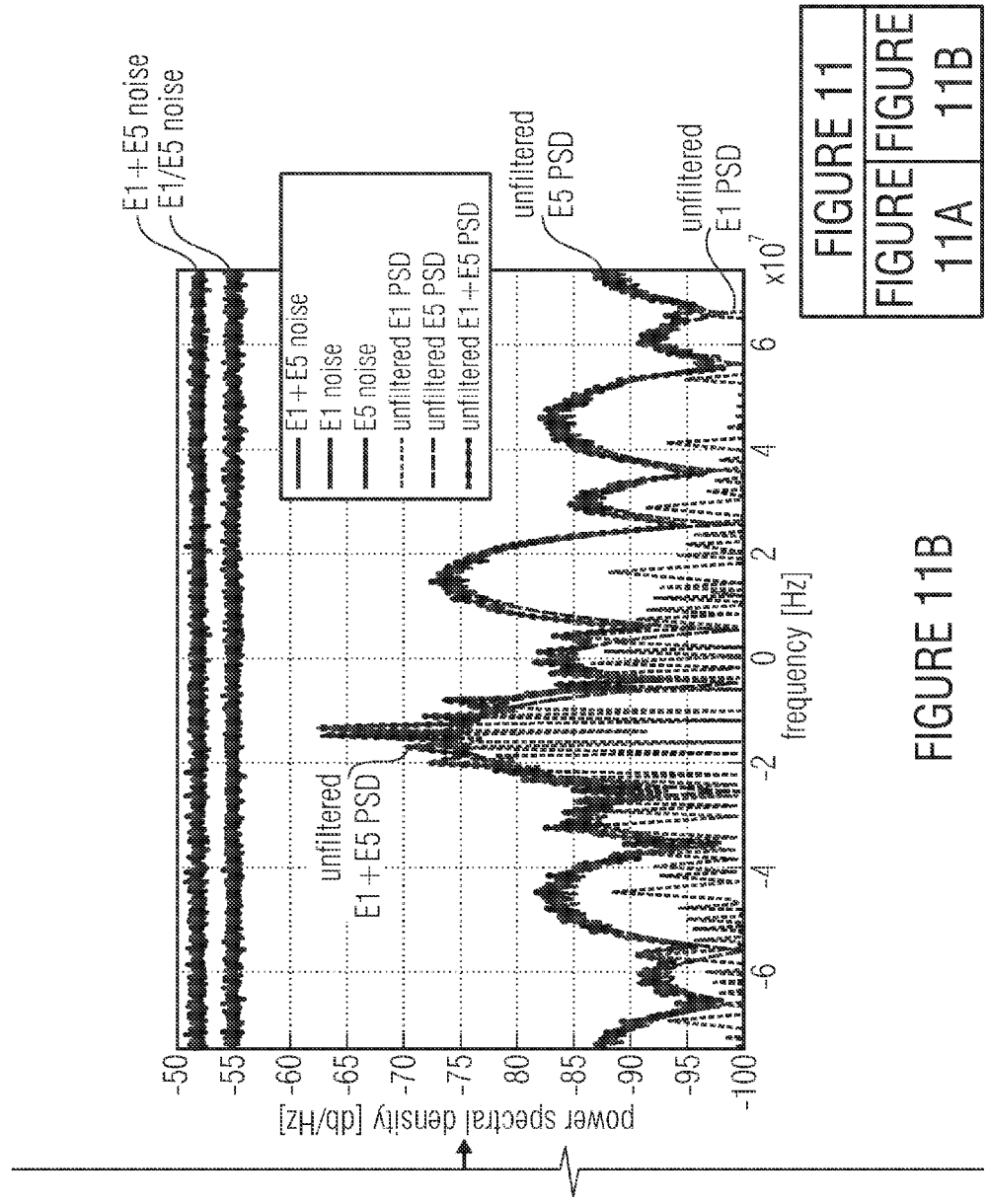

All GNSS signals received are CDMA-based (CDMA=code division multiple access) signals having negative signal-to-noise ratios (SNRs) prior to the correlation, as is shown in FIG. 11. The combiner 1110 does not only add the signals, but also their noise floors. In "A. Ruegamer, U. Santiago, and G. Rohmer, "Multi-band GNSS Front-end Architecture Suitable for Integrated Circuits," in Proceedings of the 2010 International Technical Meeting of The Institute of Navigation—ION ITM 2010, Jan. 25-27, 2010, San Diego, Calif." it has been shown, with reasoning based on the spectral separation coefficient (SSC), that the superposition loss due to the combination between the two spread spectrum signals is negligible, but that the influence of the additional noise introduced by the combination of two paths is to be observed. The combination increases the noise floor and therefore reduces the SNR or the carrier/receiver noise density $(C/N_O)$.

The increased noise floor (superposition noise) depends on the determined signal noise bandwidth (BW)—which for E5 is:

$$\Delta_{E5} = 10\log_{10}\left(1 + VGA_{E1} \cdot \frac{BW_{E1}}{BW_{E5}}\right) \qquad (10)$$

and the superposition noise for E1 is $$\Delta_{E1} = 10\log_{10}\left(1 + \frac{BW_{E5}|H_{E1Filter}|^2}{VGA_{E1} \cdot BW_{E1}}\right). \qquad (11)$$

In theory, the E1 noise bandwidth should be only about 14 MHz, i.e. it should be much smaller than the E5 noise bandwidth of almost 52 MHz, which is set by the high-pass filter and the anti-aliasing low-pass filter. The E5b signal, which has an IF of +15.55 MHz, will not be affected at all if the E1 filter comprises adequate stop-band attenuation. However, due to the wide E1 RF filter bandwidth of about 45 MHz used in this hardware demonstration model, the noise bandwidths for the E5a and E1 signals are about the same. Thus, if both paths are uniformly amplified, the SNR degradations of both the E5a and the E1 signals will amount to about 3 dB.

The power levels of the E1 and the E5 paths may be set correctly so as to minimize the SNR degradation caused by the superposition. This may be achieved with an additional variable-gain amplifier in at least one signal path. In this hardware implementation, the E1 VGA is used for controlling the noise floor power and thus the degradation between L1/E1, E5 and/or L5/E5a signals.

A noise floor calibration may be performed at the beginning or at any point in time when the digital control algorithm demands this. A possible calibration method may be implemented in the digital domain by measuring the noise variance of each path, irrespective of whether the other one is switched off. When both variances are known, the gain correction may be adjusted accordingly. With the aid of the RMS detector, the noise variance measurements of each path may also be performed in the analog domain, which is used in this hardware implementation.

If only one signal path, e.g. the L1/E1 GPS/Galileo, is needed during the detection phase, the other path may be switched off. The SNR degradation caused by the increase in the noise floor and in the power consumption of the path that is not being used is eliminated. This is a help in degraded signal environments and may also be seen as an energy saving mode. In the subsequent tracking phase, when both bands are used, the SNR degradation between L1/E1 and E5/E5a/L5 may be controlled by the E1 VGA 1120, as will be described below.

With regard to the tracking accuracy, it may be assumed, for example, that the signal is received with an unlimited front-end bandwidth and that the delay locked loop (DLL) uses a scalar product (dot product, DP) discriminator. "O. Julien, Design of Galileo L1F Receiver Tracking Loops. PhD thesis, UCGE Report No. 20227, The University of Calgary, Department of Geomatics Engineering, 2005" has shown that the 1-σ code tracking error caused by the additive white Gaussian noise may be approximated in units of meter by:

$$\sigma = \frac{c}{f_c} \cdot \sqrt{\frac{B_L(1 - B_L T/2)\delta}{2C/N_0 \alpha} \cdot \left(1 + \frac{1}{TC/N_0}\right)} \qquad (12)$$

wherein c is the speed of light expressed in m/s, $f_c$ is the data rate (chipping rate) of the signal expressed in data/s (chip/s), $B_L$ is the code loop bandwidth, expressed in Hz, T is the coherent integration time used, expressed in seconds, δ is the early-late spacing, expressed in samples, $C/N_0$ is the linear carrier-to-noise ratio in a Hertz bandwidth, expressed in Hz, and α corresponds to the slope of the main auto correlation peak and equals 1 and 4 for BPSK and CBOC modulations.

The equation 12 shows that the code tracking accuracy is not only dependent on the characteristics of the signal received (e.g. sampling rate and modulation and carrier-to-noise ratio), but also on the parameters of the code tracking loop (i.e. coherent integration time, correlator spacing and loop bandwidth).

Typical values of the parameters of the code tracking loop are indicated in the following table for the Galileo E1, E5a and E5b signals (see "C. Mongredien, M. Overbeck, and G. Rohmer, "Development and Integration of a Robust Signal Tracking Module for the Triple-Frequency Dual-Constellation GAMMAA Receiver," in Proceedings of the 23rd International Technical Meeting of the Satellite Division of the Institute of Navigation, ION GNSS 2010, Portland, Oreg., Sep. 20-24, 2010."). In addition, two tracking configurations are specified for the Galileo E1 signal for capturing the details of CBOC modulation. More specifically, the coarse and fine configurations aim at providing uncorrupted, or accurate, tracking.

| Tracking | E1 Coarse | E1 Fine | E5a | E5b |
|---|---|---|---|---|
| Coherent Integration Time [ms] | 4 | 4 | 20 | 4 |
| Early-Late Spacing [Chips] | ½ | ⅛ | ½ | ½ |
| Code Loop Bandwidth [Hz] | 2 | 1 | 1 | 1 |

To maximize the correlation gain and the tracking accuracy, the coherent integration time may be extended to include the data bit duration. Similarly, the correlator early-late spacing is selected to minimize the effect of noise and multipath without jeopardizing the tracking robustness. Assuming that a carrier support is implemented, the code tracking loop no longer needs to follow the signal variations caused by the receiver dynamics or clock inaccuracies, and the loop bandwidth may be reduced to 1 Hertz.

Figure 12:
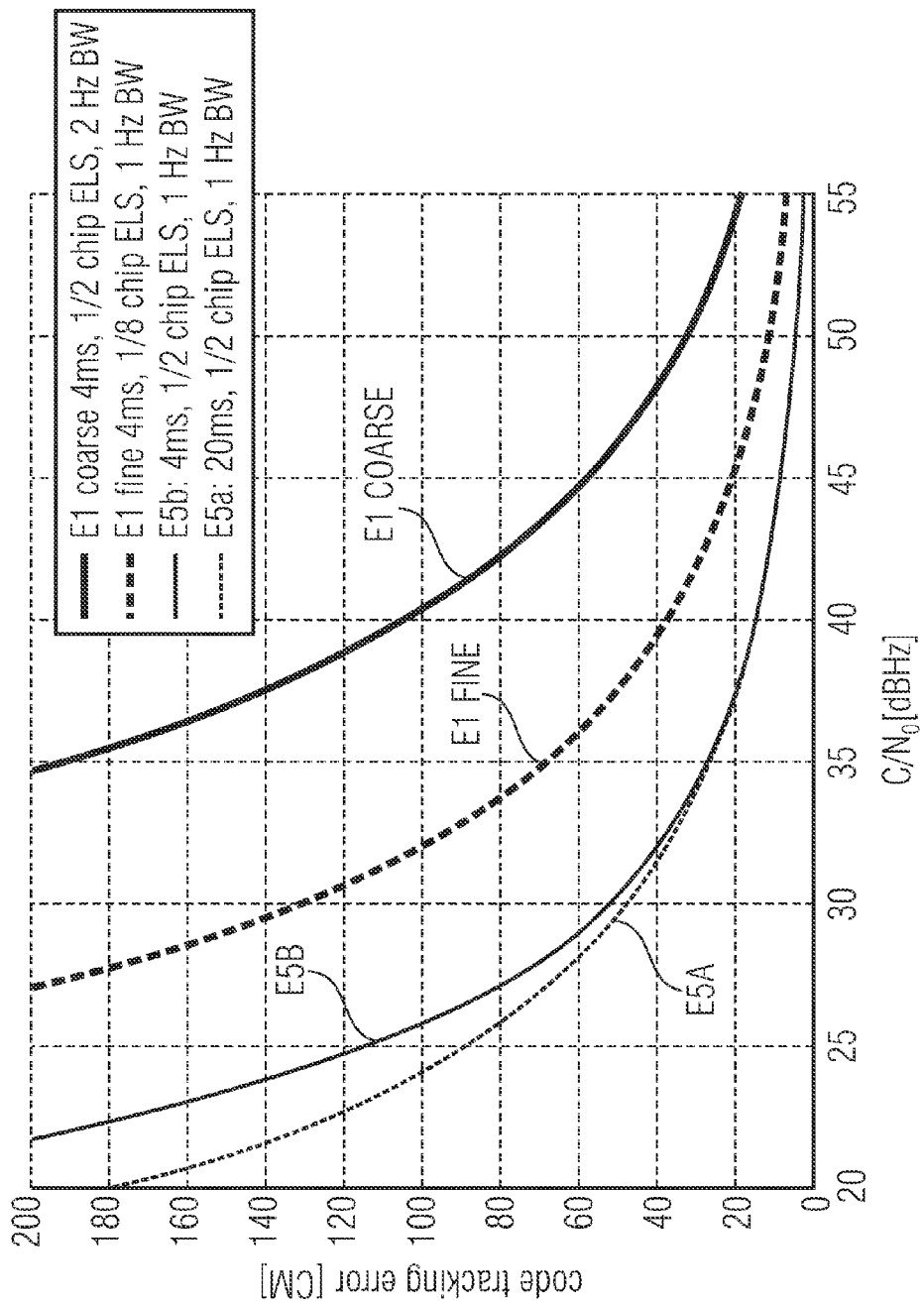
FIG. 12 shows a diagram indicating the tracking error as versus $C/N_O$.

FIG. 12 shows the standard deviation of the code tracking error in centimeters versus $C/N_0$. Due to the higher sampling rate and, therefore, to the narrower correlation peak, the tracking error will be smaller in the case of E5a/b than in the case of E1. Therefore, increasing the $C/N_0$ values will improve the code tracking accuracy more for E1 than for E5a or E5b.

Figure 13:
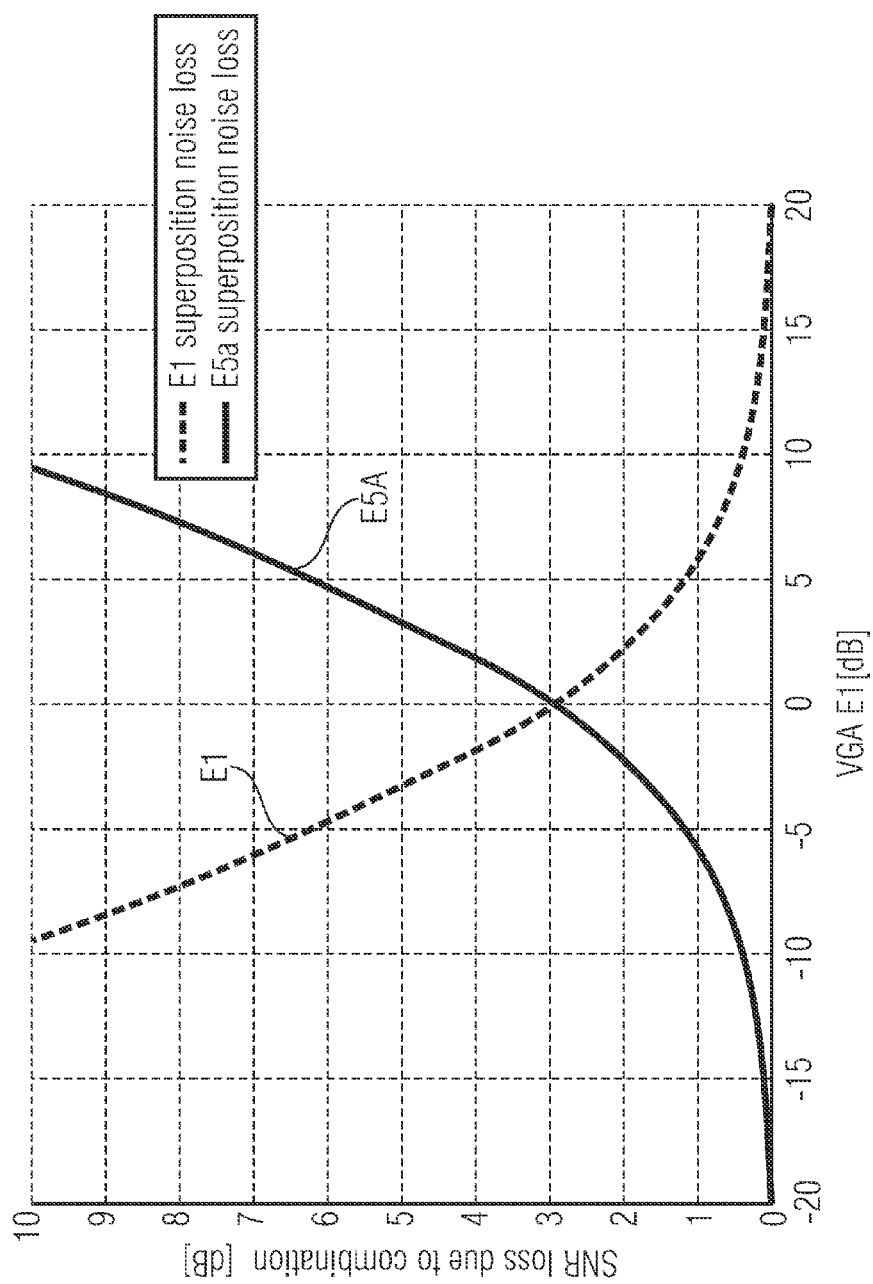
FIG. 13 shows a diagram exhibiting a superposition noise adjustable by an E1 VGA.

The superposition noise may be influenced, between the E1 and E5a paths, with the aid of a variable-gain amplifier in one or both of the signal paths. While using equations 10 and 11, the E1 path VGA, which is used in this hardware implementation, will result in the SNR losses shown in FIG. 13.

An example of using the E1 VGA to control the SNR degradation between the two signal paths will be shown in the following.

The carrier-to-noise density ratio received varies as a function of the propagation channel and of the signal power transmitted. With the exception of the ionospheric effect (which mainly leads to a distance measurement bias, as will be set forth in a later paragraph), it may be assumed that the propagation channel is the same for all signals. Since the E5a and E5b signals are emitted with about 2 dB more power than the E1 signal ("European GNSS (Galileo) Open Service Signal In Space Interface Control Document (OS SIS ICD) Issue 1," tech. rep., European Union/European GNSS Supervisory Authority (GSA), February 2010."), it may be assumed that the same difference is observed in the carrier-to-noise density ratios received.

If a $C/N_0$ value of 38 dBHz is assumed for the E1 signal, and 40 dBHz is assumed for the E5a signal, the combination will lead to an SNR degradation of about 3 dB both for the E1 and the E5a signals. Therefore, the effective $C/N_0$ would be about 35 dBHz for E1 and 37 dBHz for E5a. This SNR loss of 3 dB degrades the E5a tracking accuracy (E5a line in FIG. 12) from 0.15 m to 0.21 m or is equivalent to an accuracy degradation of 0.06 m. However, the same SNR loss of 3 dB applied to the "coarsely tracked" E1 signal (E1 coarse line in FIG. 12) increases the code tracking error standard deviation (SDT) from 0.33 m to 1.91 m or, in other words, is a loss of accuracy of 0.58 m.

Amplifying the E1 signal with, e.g., 6 dB reduces the E1 SNR loss to 1 dB, but increases the E5a SNR loss to 7 dB. When referring back to FIG. 12, the SNR loss of 7 dB in E5a reduces the $C/N_0$ from 45 dBHz to 38 dBHz and increases the code tracking error STD from 0.14 m to 0.33 m (a reduction in accuracy of 0.18 m). However, the E1 SNR loss amounts to 1 dB only, so that $C/N_0$ reduces from 38 dBHz to 37 dBHz only, and so that the code tracking error STD increases from 1.33 m to 1.49 m only, which corresponds to a reduction in accuracy of 0.16 m only.

The comparison between the scenario without E1 VGA (and with an SNR loss of 3 dB both on the E1 and on the E5a paths) and with an E1 VGA of +6 dB (and with SNR losses of 1 and 7 dB on the E1 and E5a paths, respectively) is summarized in the following table and clearly shows the advantage of using an E1 VGA.

| | E1 coarse | | E5a | |
|---|---|---|---|---|
| $C/N_0$ | 38 dBHz | 133 cm | 40 dBHz | 15 cm |
| Combiner with E1 VGA = 0 dB | 35 dBHz | 191 cm | 37 dBHz | 21 cm |
| SNR deg. | 3 dB | 58 cm | 3 dB | 6 cm |
| $C/N_0$ | 38 dBHz | 133 cm | 40 dBHz | 15 cm |
| Combiner with E1 VGA = 6 dB | 37 dBHz | 149 cm | 33 dBHz | 33 cm |
| SNR deg. | 1 dB | 16 cm | 7 dB | 18 cm |

Figure 14:
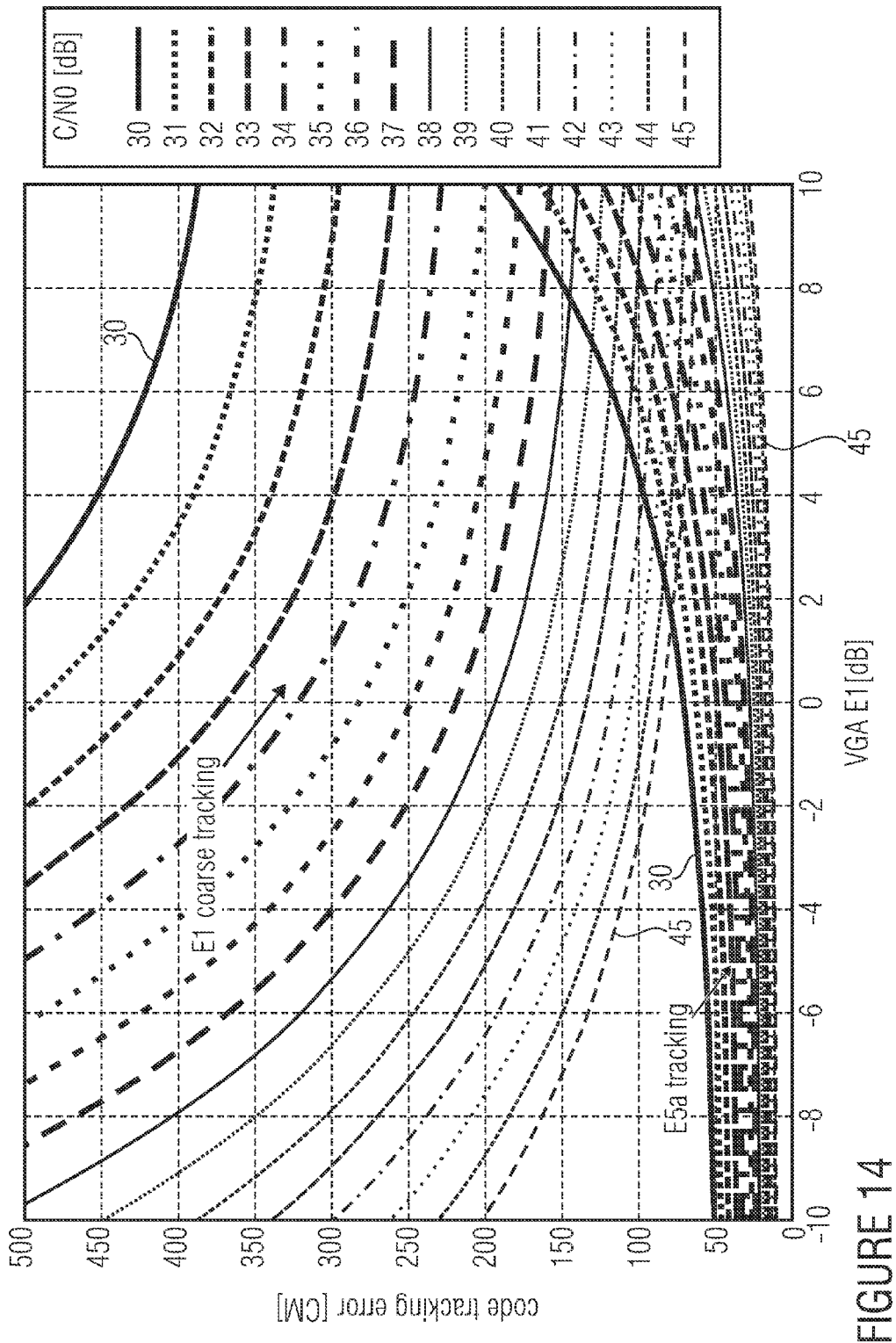
FIG. 14 shows a diagram indicating the tracking error in accordance with a signal combination having an adjustable superposition noise.

For more accurate two-frequency tracking, it is therefore recommended to use the E1 VGA so as to relieve the E1 path from as much "E5a noise" as possible. However, care should be taken to ensure that the E5a tracking reliability is not impeded by excessive SNR losses. FIG. 14, which shows an array of curves for different $C/N_0$ values and E1 VGA settings, confirms this statement.

One of the main advantages of multi-band GNSS reception is that it enables direct observation and almost complete elimination of the distance measurement bias induced by the ionosphere. Since the ionosphere is a dispersive medium, the quantities of the group delays (or, equivalently, of the distance measurement bias) which are undergone by signals broadcast by a single satellite, but at different frequencies, differ. This enables the 2- or multi-frequency users to form the so-called ionosphere-free pseudo range measurements, $\rho_{IF}$ in accordance with the following equation (see "P. Misra and P. Enge, Global Positioning System—Signals, Measurements, and Performance, Second Edition. Ganga-Jamuna Press, 2006."):

$$\rho_{IF} = \frac{f_{E1}^2}{(f_{E1}^2 - f_{E5}^2)}(\rho_{E1} + \sigma_{E1}) - \frac{f_{E5}^2}{(f_{E1}^2 - f_{E5}^2)}(\rho_{E5} + \sigma_{E5}) \quad (13)$$

$$\rho_{IF_{E1/E5}} = 2.33(\rho_{E1} + \sigma_{E1}) - 1.33(\rho_{E5} + \sigma_{E5})$$

$$\rho_{IF_{E1/E5a}} = 2.26(\rho_{E1} + \sigma_{E1}) - 1.26(\rho_{E5a} + \sigma_{E5a})$$

$$\rho_{IF_{E1/E5b}} = 2.42(\rho_{E1} + \sigma_{E1}) - 1.42(\rho_{E5b} + \sigma_{E5b})$$

wherein $f_{E1}$ is the Galileo E1 carrier frequency (1575.42 MHz), $f_{E5}$ is either the E5a carrier frequency (1176.45 MHz)

or the E5b carrier frequency (1207.14 MHz), $\rho_{E1/E5}$ are the pseudo range measurements for E1 and E5, respectively, and $\sigma_{E1/E5}$ are the pseudo range noise standard deviations for E1 and E5, respectively.

When looking at the above equation, one can see that the distance of the distance measurement bias induced by the ionosphere is at the expense of an increase in noise, the quantity of which depends on the individual frequency pseudo range standard deviations ($\sigma_{E1}$ and $\sigma_{E5}$) and on the relative spacing of the two carrier frequencies used for forming the ionosphere-free measurements $$\left( \frac{f_{E1}^2}{(f_{E1}^2 - f_{E5}^2)} \text{ and } \frac{f_{E5}^2}{(f_{E1}^2 - f_{E5}^2)} \right).$$

More specifically, it is possible to calculate $\sigma_{IF}$, the ionosphere-free pseudo range noise standard deviation, in accordance with the following equation (see "P. Misra and P. Enge, Global Positioning System—Signals, Measurements, and Performance, Second Edition. Ganga-Jamuna Press, 2006.")

$$\sigma_{IF} = \sqrt{\left(\frac{f_{E1}^2}{(f_{E1}^2 - f_{E5}^2)}\right)^2 \sigma_{E1}^2 + \left(\frac{f_{E5}^2}{(f_{E1}^2 - f_{E5}^2)}\right)^2 \sigma_{E5}^2} \quad (14)$$

$$\sigma_{IF_{E1/E5}} = \sqrt{(2.33)^2 \sigma_{E1}^2 + (1.33)^2 \sigma_{E5}^2}$$

$$\sigma_{IF_{E1/E5a}} = \sqrt{(2.26)^2 \sigma_{E1}^2 + (1.26)^2 \sigma_{E5a}^2}$$

$$\sigma_{IF_{E1/E5b}} = \sqrt{(2.42)^2 \sigma_{E1}^2 + (1.42)^2 \sigma_{E5b}^2}$$

The above equations show that the E1 pseudo range error (a factor of about 2.3) invariably has more effect on the entire ionosphere-free pseudo range than has the E5/a/b pseudo range error (a factor of about 1.3). Continuing with the example previously introduced, it is possible to directly see the impact of the E1 VGA on the ionosphere-free pseudo range noise standard deviation.

When the same initial $C/N_0$ values of 38 dBHz for the E1 signal and 40 dBHz for the E5a signal are assumed, one can see that combining the E1 and E5a paths without using the E1 VGA has led to code tracking errors of 1.91 m for the E1 signal and 0.21 m for the E5 signal. Using said values in the equation 14 results in an ionosphere-free pseudo range noise of 4.32 m.

On the other hand, one can see that combining the E1 and E5a paths with a 6 dB gain on the E1 path has led to code tracking errors of 1.49 m for the E1 signal and 0.33 m for the E5a signal. In turn, this results in an ionosphere-free pseudo range noise of 3.39 m and an improvement in accuracy of almost 1 m as compared to the case when no E1 VGA is used. The ideal case, without any signal superposition and, therefore, without any SNR degradation, but with two front-end baseband processing stages would result in an ionosphere-free pseudo range noise of 3.00 m. If, thus, the E1 VGA is set accordingly, the difference between the efficient superposition solution and the best real dual processing solution possible, which involves a lot of effort, will be smaller than 0.40 m.

This confirms the recommendation that was already made for the tracking: to improve the accuracy of the E1/E5 ionosphere-free pseudo range measurement, it is clearly advantageous to (at least partly) free the E1 path from "E5a noise" by means of the E1 VGA.

Figure 15:
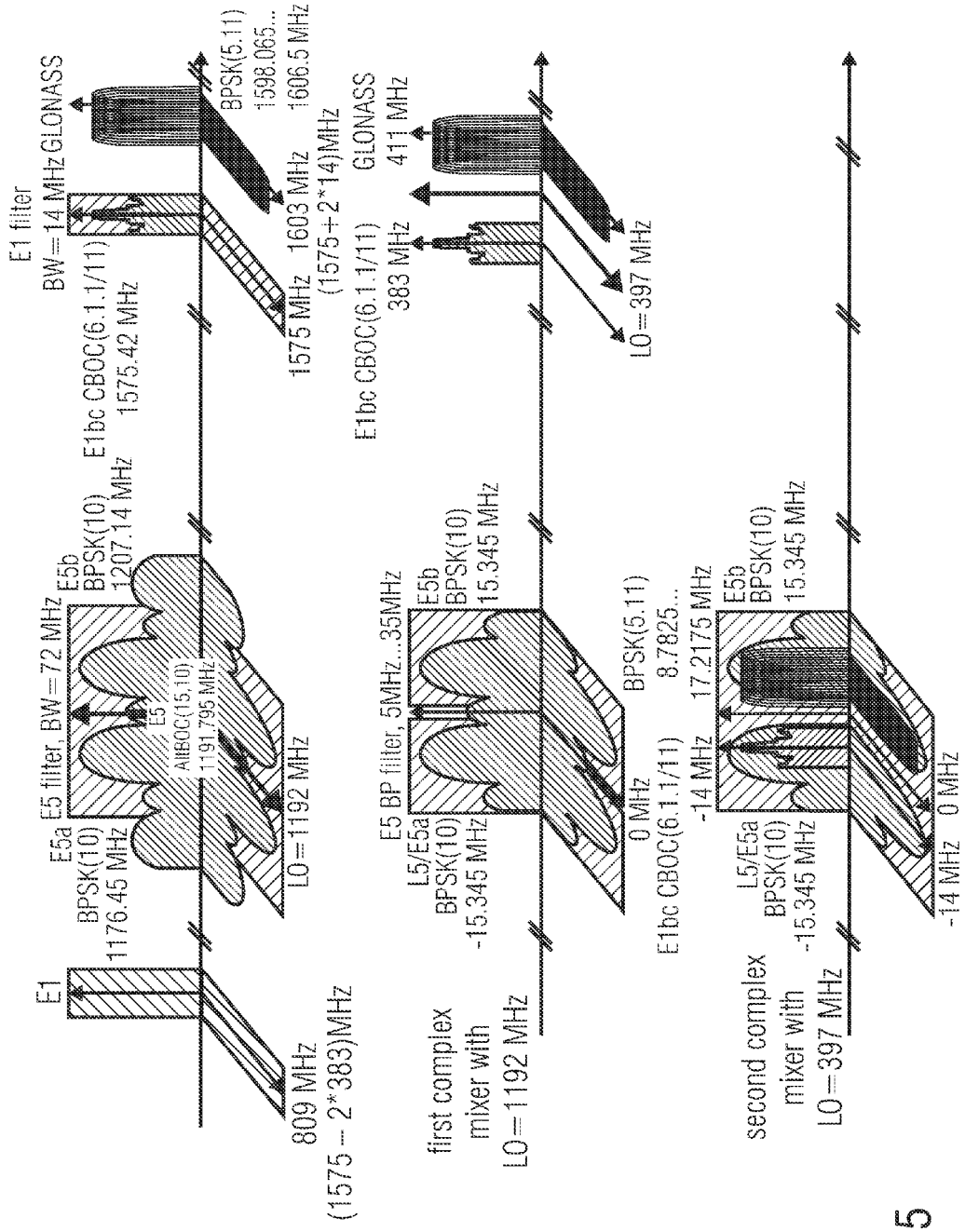
FIG. 15 shows a schematic representation of a down-conversion of signals and their intermediate frequencies.

FIG. 15 shows a schematic representation of a down-conversion of signals and their intermediate frequencies, which corresponds to the representation of FIG. 6, but additionally shows the processing of the GLONASS G1 signal. In other words, what is shown is an example of how the GLONASS G1 signal, too, may be received while using the principle of the multi-frequency band receiver on the basis of path superposition with regulation possibilities.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable. Some embodiments in accordance with the invention thus include a data carrier comprising electronically readable control signals which are able to cooperate with a programmable computer system such that any of the methods described herein is performed.

Generally, embodiments of the present invention may be implemented as a computer program product having a program code, the program code being effective to perform any of the methods when the computer program product runs on a computer. The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer. A further embodiment of the inventive methods thus is a data carrier (or a digital storage medium or a computer-readable medium) on which the computer program for performing any of the methods described herein is recorded.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A multi-frequency band receiver comprising:
a first receive path configured to receive and process a first code multiplex signal;
a second receive path configured to receive and process a second code multiplex signal, the first receive path or the second receive path comprising an amplifier comprising a variable gain factor;
a combiner configured to superpose the first processed code multiplex signal and the second processed code multiplex signal;
a code multiplex baseband stage for processing the superposed code multiplex signal to acquire and use a first baseband receive signal and a second baseband receive signal, the first baseband receive signal representing data of the first code multiplex signal, and the second baseband receive signal representing data of the second code multiplex signal;
an amplifier controller configured to control the gain factor of the amplifier comprising a variable gain factor so that the first baseband receive signal or the second baseband receive signal comprises a minimum reception quality which can be variably predetermined and is dependent on an operating state of the multi-frequency band receiver; and
an operating state controller configured to predetermine a value of the minimum reception quality, which can be variably predetermined and is dependent on the operating state, on the basis of the operating state of the multi-frequency band receiver.

2. The multi-frequency band receiver as claimed in claim 1, comprising a reception quality determiner configured to determine a reception quality of the first baseband receive signal or a reception quality of the second baseband receive signal, and wherein the amplifier controller is configured to control the gain factor on the basis of the determined reception quality of the first baseband receive signal or of the determined reception quality of the second baseband receive signal.

3. The multi-frequency band receiver as claimed in claim 1, wherein the amplifier controller is configured to set the gain factor to a fixed predetermined value on the basis of an operating state of the multi-frequency band receiver.

4. The multi-frequency band receiver as claimed in claim 1, configured such that a ratio of a signal-to-noise ratio of the first baseband receive signal and of a signal-to-noise ratio of the second baseband receive signal is changed by a change in the gain factor of the amplifier.

5. The multi-frequency band receiver as claimed in claim 1, configured such that by predetermining a first value of the minimum reception quality, which can be variably predetermined and is dependent on the operating state, for the first baseband receive signal or for the second baseband receive signal, the respectively other baseband receive signal comprises a first value of its reception quality, and by predetermining a second value of the minimum reception quality, which can be variably predetermined and is dependent on the operating state, for the first baseband receive signal or for the second baseband receive signal, the respectively other baseband receive signal comprises a second value of its reception quality, the first value of the reception quality of the other baseband receive signal being smaller than the second value of the reception quality of the other baseband receive signal if the first value of the minimum reception quality which can be variably predetermined and is dependent on the operating state is larger than the second value of the minimum reception quality which can be variably predetermined and is dependent on the operating state.

6. The multi-frequency band receiver as claimed in claim 1, wherein the code multiplex baseband stage comprises an amplifier comprising a variable gain factor and an analog-to-digital converter, the amplifier of the code multiplex baseband stage being configured to amplify the superposed code multiplex signal and to provide it to the analog-to-digital converter, so that a maximum voltage of the amplified superposed code multiplex signal is adapted to an operating range of the analog-to-digital converter.

7. The multi-frequency band receiver as claimed in claim 1, wherein the amplifier controller is configured to control the gain factor so that the first baseband receive signal or the second baseband receive signal comprises a minimum reception quality which can be variably predetermined and is dependent on the operating state and that the respectively other baseband receive signal comprises a reception quality that is higher than the minimum reception quality which can be variably predetermined and is dependent on the operating state.

8. The multi-frequency band receiver as claimed in claim 1, wherein the first receive path and the second receive path each comprise an amplifier comprising a variable gain factor, wherein the amplifier controller is configured to control the gain factor of the amplifier of the first receive path and the gain factor of the amplifier of the second receive path so that the first baseband receive signal or the second baseband receive signal comprises the minimum reception quality which can be variably predetermined and is dependent on the operating state.

9. The multi-frequency band receiver as claimed in claim 1, comprising a number of N receive paths for receiving and processing N code multiplex signals, at least N-1 receive paths of the N receive paths each comprising an amplifier comprising a variable gain factor, the combiner being configured to superpose the processed code multiplex signals of the N receive paths, the code multiplex baseband stage being configured to acquire N baseband receive signals on the basis of the superposed code multiplex signal, the amplifier controller being configured to control the gain factor of each amplifier of the at least N-1 receive paths so that at least one of the N baseband receive signals comprises the minimum reception quality which can be variably predetermined and is dependent on the operating state.

10. The multi-frequency band receiver as claimed in claim 1, wherein the first receive path is configured to process the first code multiplex signal so that the first processed code multiplex signal comprises frequencies within a baseband of the code multiplex baseband stage, and wherein the second receive path is configured to process the second code multiplex signal so that the second processed code multiplex signal comprises frequencies within the baseband of the code multiplex baseband stage.

11. The multi-frequency band receiver as claimed in claim 1, the multi-frequency band receiver being a satellite navigation receiver or a mobile radio receiver.

12. The multi-frequency band receiver as claimed in claim 1, wherein the code multiplex baseband stage is configured to perform an ionospheric correction of the first baseband receive signal and of the second baseband receive signal on the basis of the first baseband receive signal and of the second baseband receive signal.

13. The multi-frequency band receiver as claimed in claim 1, wherein the first code multiplex signal represents a first frequency band of a satellite signal, and the second code multiplex signal represents a second frequency band of the satellite signal, the first frequency band comprising a larger bandwidth than the second frequency band.

14. The multi-frequency band receiver as claimed in claim 1, wherein the first baseband receive signal comprises a larger bandwidth than the second baseband receive signal, wherein the amplifier controller is configured to control the gain factor in an initialization phase so that the second baseband receive signal comprises a first value of the minimum reception quality which can be variably predetermined and is dependent on the operating state, and is configured to control the gain factor in a localization phase so that the second baseband receive signal comprises a second value of the minimum reception quality which can be variably predetermined and is dependent on the operating state, the first value of the minimum reception quality which can be variably predetermined and is dependent on the operating state being higher than the second value of the minimum reception quality which can be variably predetermined and is dependent on the operating state, so that a reception quality of the first baseband receive signal in the localization phase is higher than a reception quality of the first baseband receive signal in the initialization phase.

15. The multi-frequency band receiver as claimed in claim 1, comprising a third receive path for receiving and processing a third code multiplex signal comprising a further amplifier comprising a variable gain factor, wherein the combiner is configured to superpose the first code multiplex signal, the second code multiplex signal and the third code multiplex signal, the code multiplex baseband stage being configured to acquire and use a third baseband receive signal, the third baseband receive signal representing data of the third code multiplex signal, the amplifier controller being configured to control the gain factor of the amplifier and the gain factor of the further amplifier so that at least two baseband receive signals of the first to third baseband receive signals comprise a minimum reception quality which can be variably predetermined and is dependent on the operating state.

16. The multi-frequency band receiver as claimed in claim 15, wherein the first code multiplex signal represents a first frequency band of a satellite signal, and the second code multiplex signal represents a second frequency band of the satellite signal, the first frequency band comprising a larger bandwidth than the second frequency band, the third code multiplex signal representing a third frequency band of the satellite signal or a mobile radio signal.

17. The multi-frequency band receiver as claimed in claim 1, comprising an oscillator stage for providing a local oscillator signal, the first receive path comprising a mixer which can be supplied with the local oscillator signal, and the second receive path comprising a mixer which can also be supplied with the local oscillator signal.

18. The multi-frequency band receiver as claimed in claim 17, wherein the mixer in the first receive path and the mixer in the second receive path are configured as in-phase quadrature-phase mixers, wherein the oscillator stage is configured to provide the local oscillator signal such that it comprises an in-phase component and a quadrature-phase component, which is supplied to the in-phase quadrature-phase mixer in the first receive path and the in-phase quadrature-phase mixer in the second receive path.

19. The multi-frequency band receiver as claimed in claim 1, wherein the first receive path comprises an in-phase output and a quadrature-phase output, wherein the second receive path comprises an in-phase output and a quadrature-phase output, and wherein the code multiplex baseband stage comprises an in-phase input and a quadrature-phase input, the combiner being configured to superpose a signal at the in-phase output of the first receive path and a signal at the in-phase output of the second receive path and to provide same to the code multiplex baseband stage at the in-phase input, and the combiner being configured to superpose a signal at the quadrature-phase output of the first receive path and a signal at the quadrature-phase output of the second receive path and to provide same to the code multiplex baseband stage at the quadrature-phase input.

20. A method of receiving code multiplex signals with a multi-frequency band receiver, comprising:
   receiving and processing a first code multiplex signal in a first receive path;
   receiving and processing a second code multiplex signal in a second receive path, the first receive path or the second receive path comprising an amplifier comprising a variable gain factor;
   superposing the first processed code multiplex signal and the second processed code multiplex signal;
   processing the superposed code multiplex signal to acquire and use a first baseband receive signal and a second baseband receive signal, the first baseband receive signal representing data of the first code multiplex signal, and the second baseband receive signal representing data of the second code multiplex signal;
   controlling the gain factor of the amplifier comprising a variable gain factor so that the first baseband receive signal or the second baseband receive signal comprises a minimum reception quality which can be variably predetermined and is dependent on an operating state of the multi-frequency band receiver; and
   predetermining a value of the minimum reception quality, on the basis of the operating state of the multi-frequency band receiver, wherein the value can be variably predetermined and is dependent on the operating state.

21. A non-transitory storage medium having stored thereon a computer program comprising a program code for performing the method of receiving code multiplex signals with a multi-frequency band receiver, said method comprising:
   receiving and processing a first code multiplex signal in a first receive path;
   receiving and processing a second code multiplex signal in a second receive path, the first receive path or the second receive path comprising an amplifier comprising a variable gain factor;
   superposing the first processed code multiplex signal and the second processed code multiplex signal;
   processing the superposed code multiplex signal to acquire and use a first baseband receive signal and a second baseband receive signal, the first baseband receive signal representing data of the first code multiplex signal, and the second baseband receive signal representing data of the second code multiplex signal;

controlling the gain factor of the amplifier comprising a variable gain factor so that the first baseband receive signal or the second baseband receive signal comprises a minimum reception quality which can be variably predetermined and is dependent on an operating state of the multi-frequency band receiver; and predetermining a value of the minimum reception quality, on the basis of an operating state of the multi-frequency band receiver, wherein the value can be variably predetermined and is dependent on the operating state, when the computer program runs on a computer or microcontroller.

* * * * *

UNITED STATES PATENT AND TRADEMARK OFFICE
CERTIFICATE OF CORRECTION

PATENT NO. : 8,824,361 B2  
APPLICATION NO. : 13/555978  
DATED : September 2, 2014  
INVENTOR(S) : Alexander Rügamer et al.

Page 1 of 1

It is certified that error appears in the above-identified patent and that said Letters Patent is hereby corrected as shown below:

Title Page, (73) Assignee:

Fraunhofer-Gesellschaft zur Foederung der Angewandten Forshung E.V.

should read:

Fraunhofer-Gesellschaft zur Foerderung der angewandten Forschung e.V.

Signed and Sealed this  
Sixteenth Day of June, 2015

Michelle K. Lee  
*Director of the United States Patent and Trademark Office*